(12) United States Patent
Stern et al.

(10) Patent No.: US 9,788,149 B2
(45) Date of Patent: Oct. 10, 2017

(54) APPARATUS AND METHODS FOR ENABLING LOCATION-BASED SERVICES WITHIN A PREMISES

(71) Applicant: Time Warner Cable Enterprises LLC, New York, NY (US)

(72) Inventors: Peter Stern, Greenwich, CT (US); Chris Cholas, Frederick, CO (US); Roger Graham Stafford, Broomfield, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 14/511,079

(22) Filed: Oct. 9, 2014

(65) Prior Publication Data

US 2015/0094098 A1     Apr. 2, 2015

Related U.S. Application Data

(62) Division of application No. 13/600,064, filed on Aug. 30, 2012, now Pat. No. 8,862,155.

(51) Int. Cl.
*H04W 4/02*     (2009.01)
*H04W 4/04*     (2009.01)
(Continued)

(52) U.S. Cl.
CPC ........... *H04W 4/02* (2013.01); *H04L 12/2801* (2013.01); *H04L 12/2898* (2013.01);
(Continued)

(58) Field of Classification Search
CPC ...................................................... H04W 4/02
(Continued)

(56) References Cited

U.S. PATENT DOCUMENTS

| 5,313,454 A | 5/1994 | Bustini et al. |
| 5,774,170 A | 6/1998 | Hite et al. |

(Continued)

OTHER PUBLICATIONS

Deering S.E., "Internet Protocol, Version 6 (IPv6) Specification," 1998.
(Continued)

*Primary Examiner* — Qun Shen
(74) *Attorney, Agent, or Firm* — Gazdzinski & Associates, PC

(57) ABSTRACT

Apparatus and methods for enabling location identification and related services in a premises. In one embodiment, location identification services are provided via a gateway device using data extracted from a wireless signal. The data is used to estimate a location of a device (based on comparison to previously gathered and/or reference data). In another embodiment, infrared (IR) or other short range wireless signals are broadcast from the client devices to a set-top-box (STB), and the STB or gateway correlates the signals to a location within the premises. A profiling process is used to establish specific locations within a premises, and associate location-specific services therewith. The location-based services include for example (i) loading particular applications and/or content when the user enters a particular location, (ii) providing information and/or advertisement opportunities when the user is near a particular public or business location, and (iii) content delivery optimization among multiple user devices.

15 Claims, 16 Drawing Sheets

(51) Int. Cl.
*H04W 4/18* (2009.01)
*H04L 12/28* (2006.01)
*H04W 64/00* (2009.01)

(52) U.S. Cl.
CPC ............. *H04W 4/043* (2013.01); *H04W 4/18* (2013.01); *H04W 64/00* (2013.01)

(58) Field of Classification Search
USPC .......................................... 455/456.1, 456.2
See application file for complete search history.

(56) References Cited

U.S. PATENT DOCUMENTS

| | | | |
|---|---|---|---|
| 5,862,312 A | 1/1999 | Mann et al. | |
| 5,878,324 A | 3/1999 | Borth et al. | |
| 5,926,205 A | 7/1999 | Krause et al. | |
| 5,935,206 A | 8/1999 | Dixon et al. | |
| 6,002,393 A | 12/1999 | Hite et al. | |
| 6,092,178 A | 7/2000 | Jindal et al. | |
| 6,128,316 A | 10/2000 | Takeda et al. | |
| 6,134,532 A | 10/2000 | Lazarus et al. | |
| 6,169,728 B1 | 1/2001 | Perreault et al. | |
| 6,211,901 B1 | 4/2001 | Imajima et al. | |
| 6,219,840 B1 | 4/2001 | Corrigan et al. | |
| 6,240,553 B1 | 5/2001 | Son et al. | |
| 6,249,680 B1* | 6/2001 | Wax ....................... G01C 21/26 370/335 | |
| 6,330,609 B1 | 12/2001 | Garofalakis et al. | |
| 6,353,626 B1 | 3/2002 | Sunay et al. | |
| 6,378,130 B1 | 4/2002 | Adams | |
| 6,434,141 B1 | 8/2002 | Oz et al. | |
| 6,463,585 B1 | 10/2002 | Hendricks et al. | |
| 6,498,783 B1 | 12/2002 | Lin | |
| 6,590,865 B1 | 7/2003 | Ibaraki et al. | |
| 6,687,735 B1 | 2/2004 | Logston et al. | |
| 6,711,148 B1 | 3/2004 | Hills | |
| 6,718,551 B1 | 4/2004 | Swix et al. | |
| 6,738,978 B1 | 5/2004 | Hendricks et al. | |
| 6,763,391 B1 | 7/2004 | Ludtke | |
| 6,842,783 B1 | 1/2005 | Boivie et al. | |
| 6,891,841 B2 | 5/2005 | Leatherbury et al. | |
| 6,986,156 B1 | 1/2006 | Rodriguez et al. | |
| 7,069,573 B1 | 6/2006 | Brooks et al. | |
| 7,075,945 B2 | 7/2006 | Arsenault et al. | |
| 7,086,077 B2 | 8/2006 | Giammaressi | |
| 7,143,431 B1 | 11/2006 | Eager et al. | |
| 7,228,555 B2 | 6/2007 | Schlack | |
| 7,308,415 B2 | 12/2007 | Kimbrel et al. | |
| 7,334,044 B1 | 2/2008 | Allen | |
| 7,340,759 B1 | 3/2008 | Rodriguez | |
| 7,346,688 B2 | 3/2008 | Allen et al. | |
| 7,363,371 B2 | 4/2008 | Kirkby et al. | |
| 7,379,494 B2 | 5/2008 | Raleigh et al. | |
| 7,464,179 B2 | 12/2008 | Hodges et al. | |
| 7,567,565 B2 | 7/2009 | La | |
| 7,577,118 B2 | 8/2009 | Haumonte et al. | |
| 7,602,820 B2 | 10/2009 | Helms et al. | |
| 7,930,715 B2 | 4/2011 | Hendricks et al. | |
| 7,954,131 B2 | 5/2011 | Cholas et al. | |
| 8,041,785 B2 | 10/2011 | Mazur et al. | |
| 8,084,792 B2 | 12/2011 | Lehmann et al. | |
| 8,306,634 B2 | 11/2012 | Nguyen et al. | |
| 8,341,242 B2 | 12/2012 | Dillon et al. | |
| 8,442,265 B1 | 5/2013 | Bosworth et al. | |
| 8,583,484 B1 | 11/2013 | Chalawsky et al. | |
| 8,713,623 B2 | 4/2014 | Brooks | |
| 8,862,155 B2 | 10/2014 | Stern et al. | |
| 8,866,911 B1 | 10/2014 | Sivertsen | |
| 8,898,270 B1 | 11/2014 | Stack et al. | |
| 9,003,436 B2 | 4/2015 | Tidwell et al. | |
| 9,027,062 B2 | 5/2015 | Patel et al. | |
| 9,071,859 B2 | 6/2015 | Lajoie | |
| 9,215,423 B2 | 12/2015 | Kimble et al. | |
| 2001/0030785 A1 | 10/2001 | Pangrac et al. | |
| 2002/0049902 A1 | 4/2002 | Rhodes | |
| 2002/0054589 A1 | 5/2002 | Ethridge et al. | |
| 2002/0059619 A1 | 5/2002 | Lebar | |
| 2002/0063621 A1 | 5/2002 | Tseng et al. | |
| 2002/0087976 A1 | 7/2002 | Kaplan et al. | |
| 2002/0123928 A1 | 9/2002 | Eldering et al. | |
| 2002/0129378 A1 | 9/2002 | Cloonan et al. | |
| 2003/0002862 A1 | 1/2003 | Rodriguez et al. | |
| 2003/0005453 A1 | 1/2003 | Rodriguez et al. | |
| 2003/0007516 A1 | 1/2003 | Abramov et al. | |
| 2003/0046704 A1 | 3/2003 | Laksono et al. | |
| 2003/0056217 A1 | 3/2003 | Brooks | |
| 2003/0061619 A1 | 3/2003 | Giammaressi | |
| 2003/0071117 A1 | 4/2003 | Meade | |
| 2003/0114162 A1* | 6/2003 | Chheda ................ H04W 16/02 455/447 | |
| 2003/0139980 A1 | 7/2003 | Hamilton | |
| 2003/0179773 A1 | 9/2003 | Mocek et al. | |
| 2003/0217365 A1 | 11/2003 | Caputo | |
| 2004/0019691 A1 | 1/2004 | Daymond et al. | |
| 2004/0133907 A1 | 7/2004 | Rodriguez et al. | |
| 2004/0146006 A1 | 7/2004 | Jackson | |
| 2004/0187159 A1 | 9/2004 | Gaydos et al. | |
| 2005/0007278 A1* | 1/2005 | Anson ....................... G01S 3/48 342/451 | |
| 2005/0039205 A1 | 2/2005 | Riedl | |
| 2005/0060742 A1 | 3/2005 | Riedl et al. | |
| 2005/0060745 A1 | 3/2005 | Riedl et al. | |
| 2005/0086691 A1 | 4/2005 | Dudkiewicz et al. | |
| 2005/0111844 A1 | 5/2005 | Compton et al. | |
| 2005/0114900 A1 | 5/2005 | Ladd et al. | |
| 2005/0125832 A1 | 6/2005 | Jost et al. | |
| 2005/0168323 A1 | 8/2005 | Lenoir et al. | |
| 2005/0176444 A1 | 8/2005 | Tanaka | |
| 2005/0289618 A1 | 12/2005 | Hardin | |
| 2005/0289619 A1 | 12/2005 | Melby | |
| 2006/0036750 A1 | 2/2006 | Ladd et al. | |
| 2006/0130107 A1 | 6/2006 | Gonder et al. | |
| 2006/0130113 A1 | 6/2006 | Carlucci et al. | |
| 2006/0154674 A1 | 7/2006 | Landschaft et al. | |
| 2006/0165197 A1* | 7/2006 | Morita ................. H04B 1/7113 375/326 | |
| 2006/0171390 A1 | 8/2006 | La | |
| 2006/0171423 A1 | 8/2006 | Helms et al. | |
| 2006/0218604 A1 | 9/2006 | Riedl et al. | |
| 2006/0218632 A1 | 9/2006 | Corley et al. | |
| 2006/0248555 A1 | 11/2006 | Eldering | |
| 2006/0253328 A1 | 11/2006 | Kohli et al. | |
| 2006/0253864 A1 | 11/2006 | Easty | |
| 2006/0277569 A1 | 12/2006 | Smith | |
| 2007/0022459 A1 | 1/2007 | Gaebel, Jr. et al. | |
| 2007/0033531 A1 | 2/2007 | Marsh | |
| 2007/0076728 A1 | 4/2007 | Rieger et al. | |
| 2007/0089127 A1 | 4/2007 | Flickinger et al. | |
| 2007/0094691 A1 | 4/2007 | Gazdzinski | |
| 2007/0113243 A1 | 5/2007 | Brey | |
| 2007/0217436 A1 | 9/2007 | Markley et al. | |
| 2007/0233857 A1 | 10/2007 | Cheng et al. | |
| 2007/0266395 A1 | 11/2007 | Lee et al. | |
| 2007/0276926 A1 | 11/2007 | LaJoie et al. | |
| 2008/0101460 A1 | 5/2008 | Rodriguez | |
| 2008/0104634 A1 | 5/2008 | Gajdos et al. | |
| 2008/0109307 A1 | 5/2008 | Ullah | |
| 2008/0134274 A1 | 6/2008 | Derrenberger et al. | |
| 2008/0141317 A1 | 6/2008 | Radloff et al. | |
| 2008/0155614 A1 | 6/2008 | Cooper et al. | |
| 2008/0182591 A1* | 7/2008 | Krikorian ............. H04W 68/00 455/456.3 | |
| 2008/0183705 A1 | 7/2008 | Shivaji-Rao et al. | |
| 2008/0192820 A1 | 8/2008 | Brooks et al. | |
| 2008/0229354 A1 | 9/2008 | Morris et al. | |
| 2008/0244667 A1 | 10/2008 | Osborne | |
| 2008/0273591 A1 | 11/2008 | Brooks et al. | |
| 2009/0025027 A1 | 1/2009 | Craner | |
| 2009/0064251 A1 | 3/2009 | Savoor et al. | |
| 2009/0170479 A1 | 7/2009 | Jarenskog | |
| 2009/0210899 A1 | 8/2009 | Lawrence-Apfelbaum et al. | |
| 2009/0244290 A1 | 10/2009 | Mckelvey et al. | |
| 2010/0014496 A1 | 1/2010 | Kalika et al. | |
| 2010/0070867 A1 | 3/2010 | Lemmers | |

(56) References Cited

U.S. PATENT DOCUMENTS

| | | |
|---|---|---|
| 2010/0081416 A1 | 4/2010 | Cohen |
| 2010/0122288 A1 | 5/2010 | Minter et al. |
| 2010/0150027 A1 | 6/2010 | Atwal et al. |
| 2010/0151816 A1* | 6/2010 | Besehanic ............... G06Q 30/02 |
| | | 455/405 |
| 2010/0159951 A1* | 6/2010 | Shkedi ................. H04W 4/023 |
| | | 455/456.1 |
| 2010/0251305 A1 | 9/2010 | Kimble et al. |
| 2010/0309051 A1* | 12/2010 | Moshfeghi ............ G01S 5/0236 |
| | | 342/378 |
| 2010/0313225 A1 | 12/2010 | Cholas et al. |
| 2011/0015989 A1 | 1/2011 | Tidwell et al. |
| 2011/0093900 A1 | 4/2011 | Patel et al. |
| 2011/0103374 A1 | 5/2011 | Lajoie et al. |
| 2011/0107389 A1 | 5/2011 | Chakarapani |
| 2011/0112717 A1* | 5/2011 | Resner ................... G07C 5/008 |
| | | 701/31.4 |
| 2011/0138064 A1 | 6/2011 | Rieger et al. |
| 2011/0163888 A1 | 7/2011 | Goedde |
| 2011/0167440 A1 | 7/2011 | Greenfield |
| 2011/0206136 A1 | 8/2011 | Bekedam et al. |
| 2011/0225619 A1 | 9/2011 | Kesireddy et al. |
| 2011/0235577 A1 | 9/2011 | Hintermeister et al. |
| 2011/0247029 A1 | 10/2011 | Yarvis et al. |
| 2011/0286437 A1* | 11/2011 | Austin ..................... H04W 4/02 |
| | | 370/338 |
| 2012/0023535 A1 | 1/2012 | Brooks et al. |
| 2012/0030716 A1 | 2/2012 | Zhang et al. |
| 2012/0046049 A1* | 2/2012 | Curtis .................. H04W 4/025 |
| | | 455/456.3 |
| 2012/0054785 A1 | 3/2012 | Yang et al. |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0202447 A1* | 8/2012 | Edge ....................... H04W 4/02 |
| | | 455/404.2 |
| 2012/0222081 A1 | 8/2012 | Schaefer et al. |
| 2012/0302259 A1* | 11/2012 | Busch ..................... H04W 4/02 |
| | | 455/456.3 |
| 2012/0330759 A1 | 12/2012 | Aggarwal et al. |
| 2013/0045681 A1 | 2/2013 | Dua |
| 2013/0046623 A1 | 2/2013 | Moritz et al. |
| 2013/0081097 A1 | 3/2013 | Park et al. |
| 2013/0095848 A1* | 4/2013 | Gold ..................... H04W 4/023 |
| | | 455/456.1 |
| 2013/0100818 A1 | 4/2013 | Qiu et al. |
| 2013/0254787 A1 | 9/2013 | Cox et al. |
| 2014/0046624 A1* | 2/2014 | Miettinen ................. G01S 1/70 |
| | | 702/150 |
| 2014/0066098 A1 | 3/2014 | Stern et al. |
| 2014/0215506 A1 | 7/2014 | Kalmes et al. |
| 2014/0282721 A1 | 9/2014 | Kuncl et al. |
| 2014/0309868 A1 | 10/2014 | Ricci |
| 2014/0359649 A1 | 12/2014 | Cronk et al. |
| 2015/0058883 A1 | 2/2015 | Tidwell et al. |
| 2015/0058909 A1 | 2/2015 | Miller et al. |
| 2015/0103685 A1 | 4/2015 | Butchko et al. |
| 2015/0106846 A1 | 4/2015 | Chen et al. |
| 2015/0189377 A1 | 7/2015 | Wheatley et al. |
| 2015/0365833 A1 | 12/2015 | Stafford et al. |
| 2016/0019103 A1 | 1/2016 | Basra |
| 2016/0127185 A1 | 5/2016 | Mcallister |

OTHER PUBLICATIONS

Internet Protocol DARPA Internet Program Protocol Spec, 1981.
Cisco Intelligent Network Architecture for Digital Video—SCTE Cable-Tec Expo 2004 information page, Orange County Convention Center, Jun. 2004, 24 pages.
Kanouff, Communications Technology: Next-Generation Bandwidth Management—The Evolution of the Anything-to-Anywhere Network, 8 pages, Apr. 1, 2004.
OpenVision Session Resource Manager—Open Standards-Based Solution Optimizes Network Resources by Dynamically Assigning Bandwidth in the Delivery of Digital Services article, 2 pages, (copyright 2006), http://www.imake.com/hopenvision).

* cited by examiner

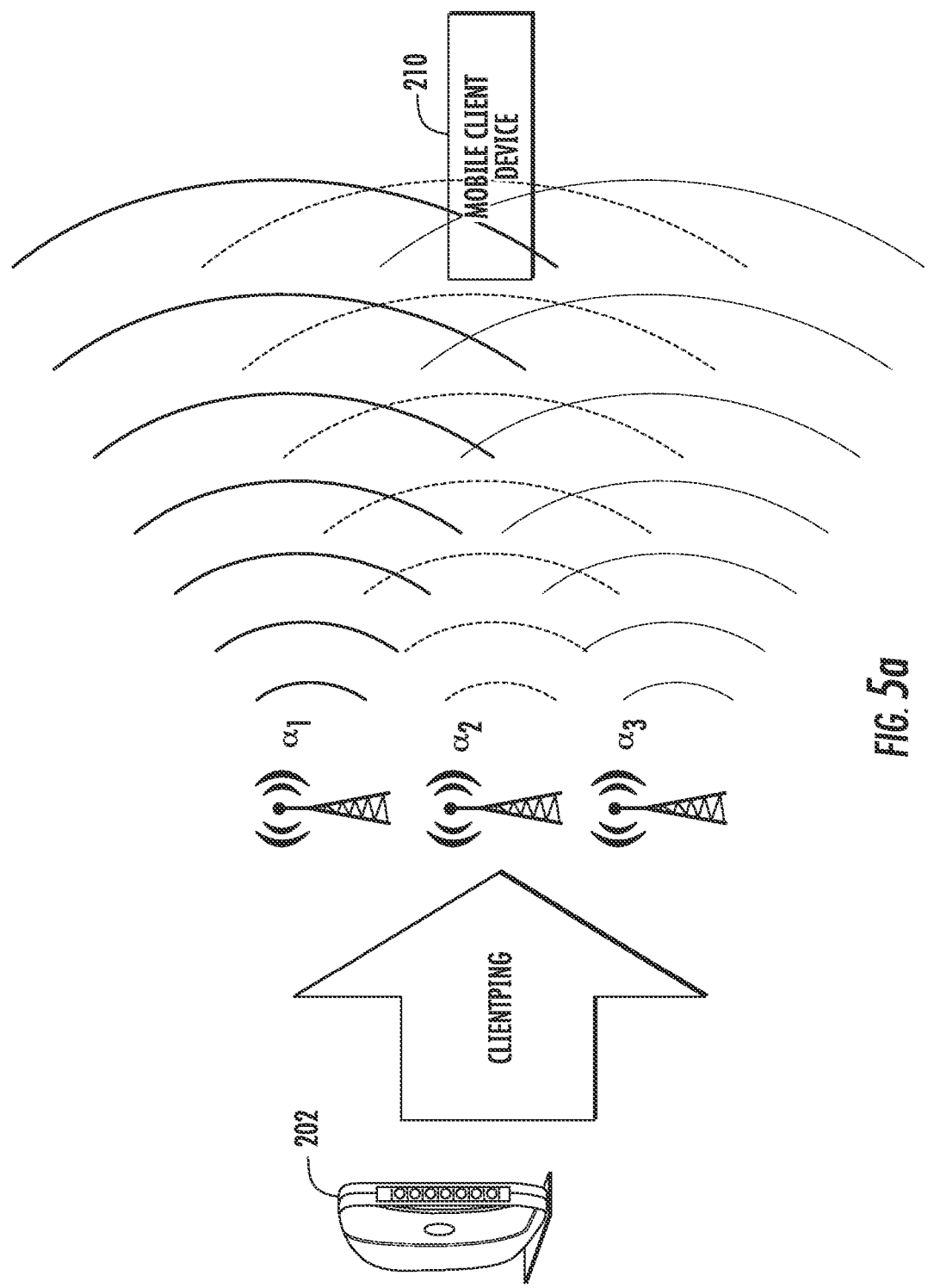

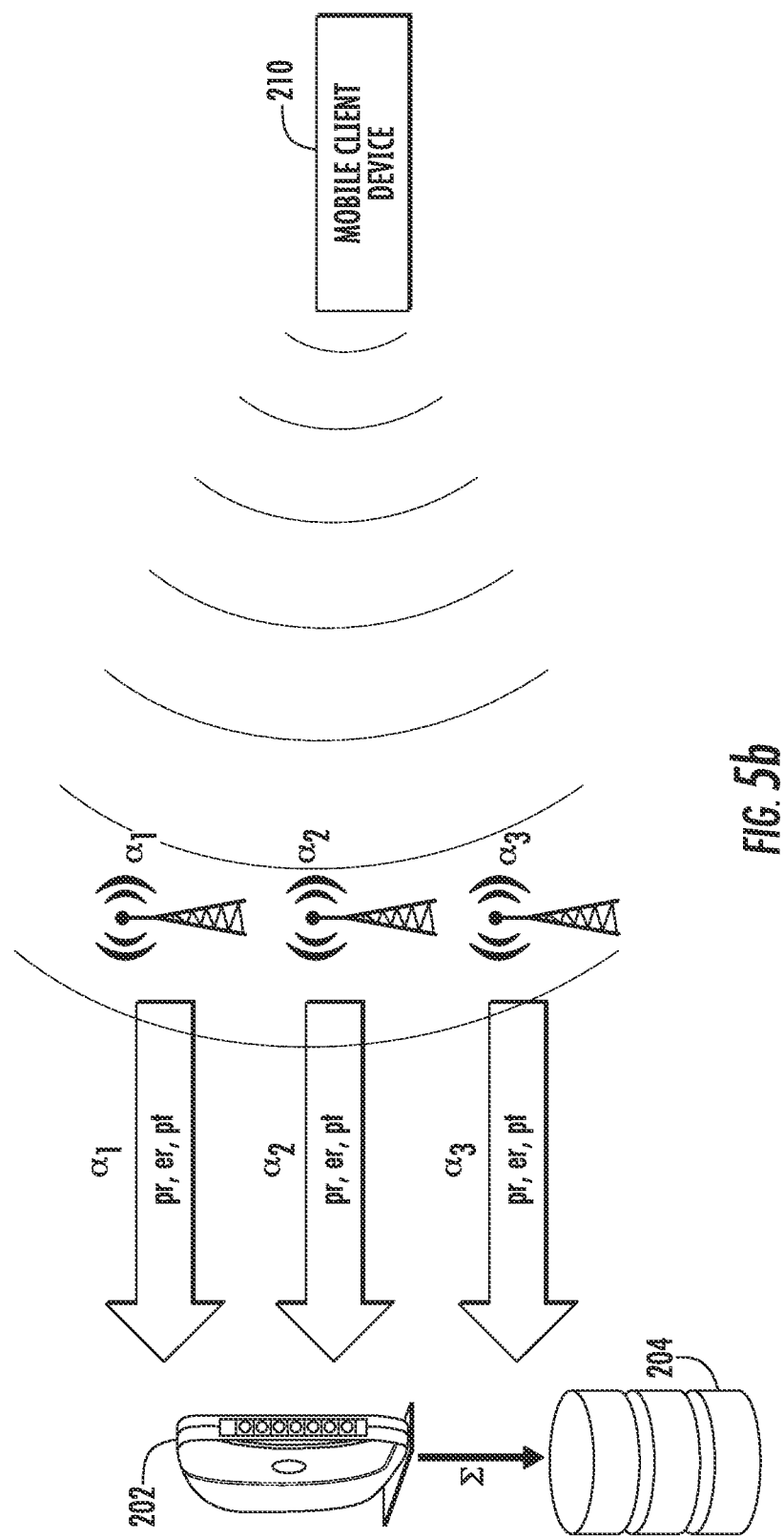

APPARATUS AND METHODS FOR ENABLING LOCATION-BASED SERVICES WITHIN A PREMISES

PRIORITY

This application is a divisional of and claims priority to co-owned U.S. patent application Ser. No. 13/600,064 of the same title filed Aug. 30, 2012, issuing as U.S. Pat. No. 8,862,155 on Oct. 14, 2014, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of data and content distribution and delivery. In one exemplary aspect, the invention relates to enabling location identification services within a premises.

2. Description of Related Technology

Content distribution networks (such as e.g., Cable Television (CATV), satellite, or hybrid fiber/copper (HFCu) systems) provide content from various content sources at a network headend to a plurality of subscriber devices. In a typical "managed" network, a network operator (e.g., multiple systems operator or MSO) provides access to content via the network. Generally, the MSO provides audio/video content to subscribers from the network headend via the distribution network.

Recent advances in digital information processing and technology have made a wide range of additional services and functions available for delivery to consumers at various types of devices for very reasonable prices or subscription fees. These services and functions include delivery of digital content or programming (movies, etc.), digital video-on-demand (VOD) services, personal video recorder (PVR) and networked PVR (nPVR) services, Internet Protocol television (IPTV), digital media playback and recording, as well high speed Internet access (including so-called "Internet TV", where television programming is delivered over the Internet), IP-based telephony (e.g., VoIP), and access to client applications via mobile devices. Other services available to network users include without limitation access to, and recording of, digital music (e.g., MP3 files), and submission of "organic" media (e.g., home-grown Youtube™ videos, etc.).

Currently, many of these services are provided to users via a wide variety of different equipment environments and delivery paradigms including, inter alia, cable or satellite modems or QAMs, HFCu (i.e., Hybrid Fiber-copper distribution via indigenous POST/PSTN and/or coaxial wiring in a premises), optical fiber such as FTTC, FTTH, etc., Wi-Fi™ hubs, Ethernet hubs, gateways, switches, and routers, and to a plurality of user equipment types (e.g., set-top boxes, personal (desktop) computers, laptop computers, other mini-computers such as so-called "netbooks" and mini-notebook computers, and/or other devices). Recent advances in consumer electronics have also led to the widespread introduction of a variety of portable media devices (PMDs) such as, inter alia, portable digital music devices such as the well known Apple iPod™, and other so-called "MP3 players", cellular telephones/smartphones, handheld computers, tablets such as the Kindle™ and Nook™ and iPad™, and personal digital assistants (PDA), which allow users to store and playback audio and video files.

Various device applications provide or incorporate services which vary based on a location of a portable media device (or user thereof) within a given premises. For example, certain applications may have modified volume, brightness, etc. settings based on what room a person is in. Additionally, power-saving systems rely on a location of a person within the home. For example, if it can be determined that no one is in e.g., the family room, power to a rendering or other device in that room may be cut. These systems, however, require a user to manually enter a location via a user interface or otherwise require advanced detection technologies (e.g., infrared or motion detectors) to be installed within a premises.

Hence, methods and apparatus are needed which enable location-based services to function independent of manual entry of a location and using services and functions of devices currently existing within a home network. Such location identification methods and apparatus would ideally be provided across multiple client devices within a premises, and would be readily downloadable or made otherwise accessible to existing user devices.

SUMMARY OF THE INVENTION

The present invention provides, inter alia, apparatus and methods for enabling location identification services within a premises.

In a first aspect of the invention, a method of providing location-based services within a consumer premises is disclosed. In one embodiment, the method includes generating a plurality of profiles, each of said plurality of profiles comprising a plurality of device-specific data obtained from respective individual ones of a plurality of devices within said consumer premises. In one variant, the method further includes: assigning an identification of a location within said consumer premises to each of said profiles; storing said plurality of profiles with said respective assigned identification at a storage entity; receiving a location request from an application running on at least one of said plurality of devices within said consumer premises, said location request comprising a plurality of second device-specific data, said second device-specific data being specific to said at least one of said plurality of devices within said consumer premises; and in response to said request, examining said plurality of second device-specific data and said plurality of profiles to determine an identification indicative of a current location of said at least one device within said consumer premises.

In a second aspect of the invention, a method of generating a client device-specific profile is disclosed. In one embodiment, the profile relates a client device to a position thereof within a given area, and said method includes: transmitting at least one request signal from a gateway device to the client device, said at least one request signal being transmitted to said client device when said client device is located at a position within said given area; receiving, in response to said transmitted at least one request signal, a response signal from said client device indicating one or more device-specific characteristics; and storing a profile comprising an association of said one or more device-specific characteristics to said position within said given area.

In a third aspect of the invention, a method of correlating a mobile client device to a particular location within a user premises is disclosed. In one embodiment, the method comprises: (i) receiving from an intermediary device a first communication, the first communication comprising information identifying the intermediary device and the mobile client device, (ii) evaluating the information identifying the intermediary device against pre-stored information associating a plurality of intermediary devices to individual ones of known locations to determine the particular location of the intermediary device, and (iii) correlating the mobile client device to the particular location of the intermediary device.

In a fourth aspect of the invention, a gateway apparatus is disclosed. In one embodiment, the gateway apparatus comprises: at least one interface configured for wireless communication within a consumer premises, a processor configured to run at least one computer program thereon, and a storage apparatus in data communication with the processor and the at least one interface and having the at least one computer program stored thereon, the at least one program comprising a plurality of instructions which are configured to, when executed by the processor: (i) generate a device profile for each of a plurality of mobile devices associated to the consumer premises, each of the device profiles correlating a particular mobile device to a particular location within the premises, (ii) for each of the particular locations, assign an identifier, (iii) associate the plurality of profiles with the respective assigned identifiers, (iv) receive a communication from an individual one of the plurality of mobile devices via the at least one interface, and (v) utilize information within the communication to identify a profile associated to the individual one of the mobile devices, the profile associated to a particular one of the plurality of locations within the premises.

In a fifth aspect of the invention, a mobile user wireless device configured for location-specific operation is disclosed. In one embodiment, the device includes: a processor; a wireless transceiver in data communication with the processor; and a storage device in data communication with the processor and having a computer program disposed thereon. In one variant, the program is configured to, when executed: generate, in response to a first transmission received at the transceiver, a reply uniquely identifying the mobile device; cause transmission of the reply to a gateway device; receive a second transmission including location information of the mobile device within a premises; and based at least in part on the location information, cause adjustment of at least one user interface so as to provide at least one location-specific content element to a user of the device.

In a sixth aspect of the invention, a system configured for location-specific operation of one or more client or user devices is disclosed.

In a seventh aspect of the invention, a computer readable apparatus having at least one program disposed thereon is disclosed. In one embodiment, the at least one program is configured for location-specific operation of one or more client or user devices.

These and other aspects of the invention shall become apparent when considered in light of the disclosure provided herein.

BRIEF DESCRIPTION OF THE DRAWINGS

FIG. 5a is an illustration of an exemplary communication useful in performance of the method of FIG. 4.

FIG. 5b is an illustration of a second exemplary communication useful in performance of the method of FIG. 4.

Figure 1:
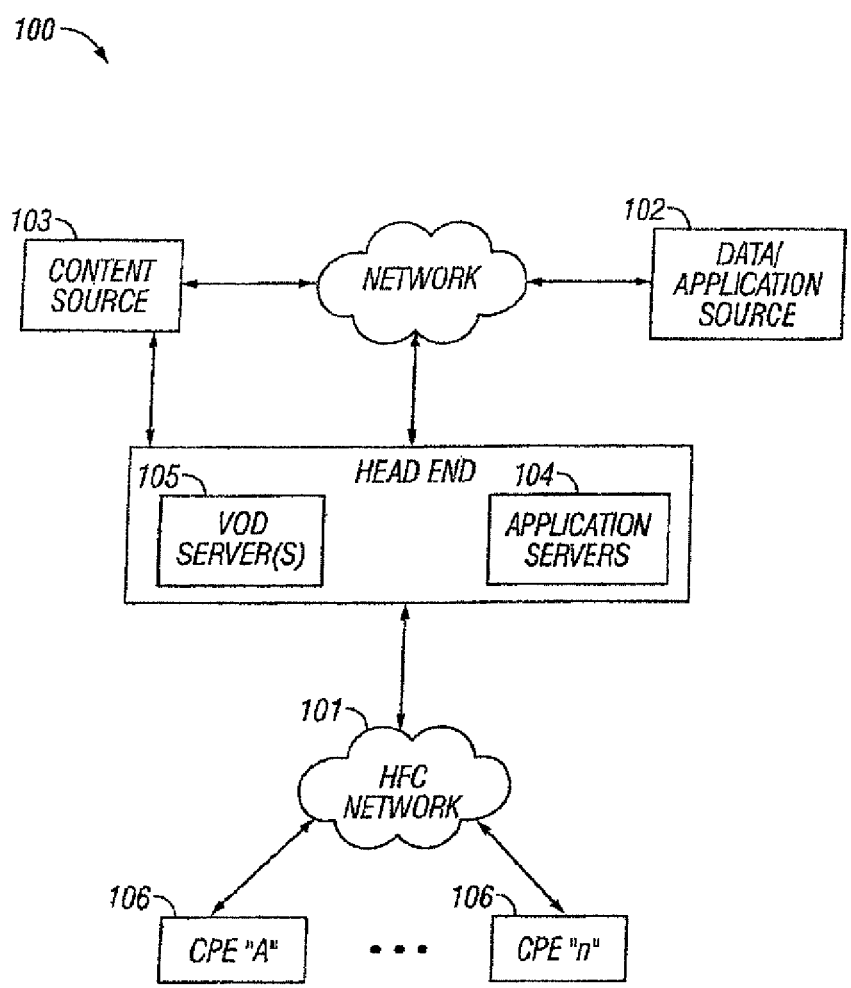
FIG. 1 is a functional block diagram illustrating an exemplary HFC cable network configuration useful with the present invention.

All Figures © Copyright 2012 Time Warner Cable, Inc. All rights reserved.

DETAILED DESCRIPTION OF THE INVENTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "consumer premises equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "DOCSIS" refers to any of the existing or planned variants of the Data Over Cable Services Interface Specification, including for example DOCSIS versions 1.0, 1.1, 2.0 and 3.0.

As used herein, the term "gateway" includes, without limitation, devices configured to interface with a network, and pass signals to or exchange signals with, another device in communication therewith. Various exemplary gateways are described in, inter alia, co-owned U.S. Pat. No. 7,954, 131 issued on May 31, 2011 entitled "PREMISES GATEWAY APPARATUS AND METHODS FOR USE IN A CONTENT-BASED NETWORK", U.S. patent application Ser. No. 12/582,619 filed on Oct. 20, 2009 and entitled "GATEWAY APPARATUS AND METHODS FOR DIGITAL CONTENT DELIVERY IN A NETWORK", and U.S. patent application Ser. No. 12/480,597 filed on Jun. 8, 2009 and entitled "MEDIA BRIDGE APPARATUS AND METHODS", each of the foregoing being incorporated herein by reference in its entirety.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, intranets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer system or network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers without limitation to either a group of service users (e.g. subscribers), or the resources shared by them in the form of for example entire cable RF signal, only the RF channels used to receive the service or otherwise treated as a single logical unit by the network for resource assignment.

As used herein, the term "Wi-Fi" refers to, without limitation, any of the variants of IEEE-Std. 802.11 or related standards including 802.11 a/b/g/n/s/v/ac or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

In one salient aspect, the present invention discloses methods and apparatus for enabling location identification services within a premises. In one exemplary embodiment, location identification services are provided via a gateway device, and utilize beamforming technology as set forth in IEEE standard 802.11ac™ entitled *"Very High Throughput 5 GHz"* (currently in draft form) and its supporting documentation, all of which is incorporated herein by reference in its entirety. Using beamforming technology, signals sent between multiple antennas (up to 8 in the exemplary 802.11ac implementation) of the gateway device and client devices are coordinated to combine constructively at the device receiving the signal. Information is extracted during this process which is used to identify a location within a user's home. For example, various data relating to e.g., antenna receive power (pr), the error rate (er), and the client transmit power (pt), signal quality, and amplification needed to transmit signals to and/or receive signals from individual ones of the devices is collected. The data is then used to estimate a location of a device (such as based on comparison to previously gathered data and/or standard or reference data).

In another embodiment, infrared (IR) or other short range wireless signals are broadcast from the client devices to the STB, the STB or gateway then correlates the messages from the devices to a location within the premises.

In yet another embodiment, a wireless user device with beamforming capability is used to derive and provide location information (e.g., relative to a known fixed location).

A profiling process may also be performed for each designated location within a premises. In one variant, a Location Profiler (LOCP) application running on at least one of the gateway or STB is used to establish a "qualifier" (or location name) for specific locations in a premises using an initial profile process to gather data regarding devices at the specific locations within the premises. The gateway (and/or STB) is then able to automatically provide a location name to the devices when providing location services thereto.

In one embodiment, the location-based services include services which enable particular applications and/or content to be automatically loaded or provided when the user enters a particular location. In another embodiment, the location-based services include services which provide information and/or advertisement opportunities when the user is near a particular public or business location. The location-based services of the present invention may be further utilized to optimize content delivery to multiple user devices.

Additionally, a device associated with the user's person (such as e.g., a mobile device) may indicate where the user is within a premises, the system may then automatically transfer content to the devices within the general location of the user, and/or predict a pattern of movement within the user premises (which can be used to further predict where content should be moved in order to follow the user throughout the premises).

Detailed Description of Exemplary Embodiments

Exemplary embodiments of the apparatus and methods of the present invention are now described in detail. While these exemplary embodiments are described in the context of the aforementioned hybrid fiber/coax (HFC) cable system architecture having a multiple systems operator (MSO), digital networking capability, IP delivery capability, and plurality of client devices/CPE, the general principles and advantages of the invention may be extended to other types of networks and architectures, whether broadband, narrowband, wired or wireless, managed or unmanaged, or otherwise, the following therefore being merely exemplary in nature. For example, the invention may be practiced over a fiber-to-the-home (FTTH) or fiber-to-the-curb (FTTC) system, HFCu networks, or over satellite or millimeter wave-based networks.

It will also be appreciated that while described generally in the context of a consumer (i.e., residential) end user domain, the present invention may be readily adapted to other types of environments (e.g., commercial/enterprise, government/military, etc.) as well. Myriad other applications are possible.

It is further noted that while exemplary embodiments are described primarily in the context of a hybrid fiber/conductor (e.g., cable) system with legacy 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
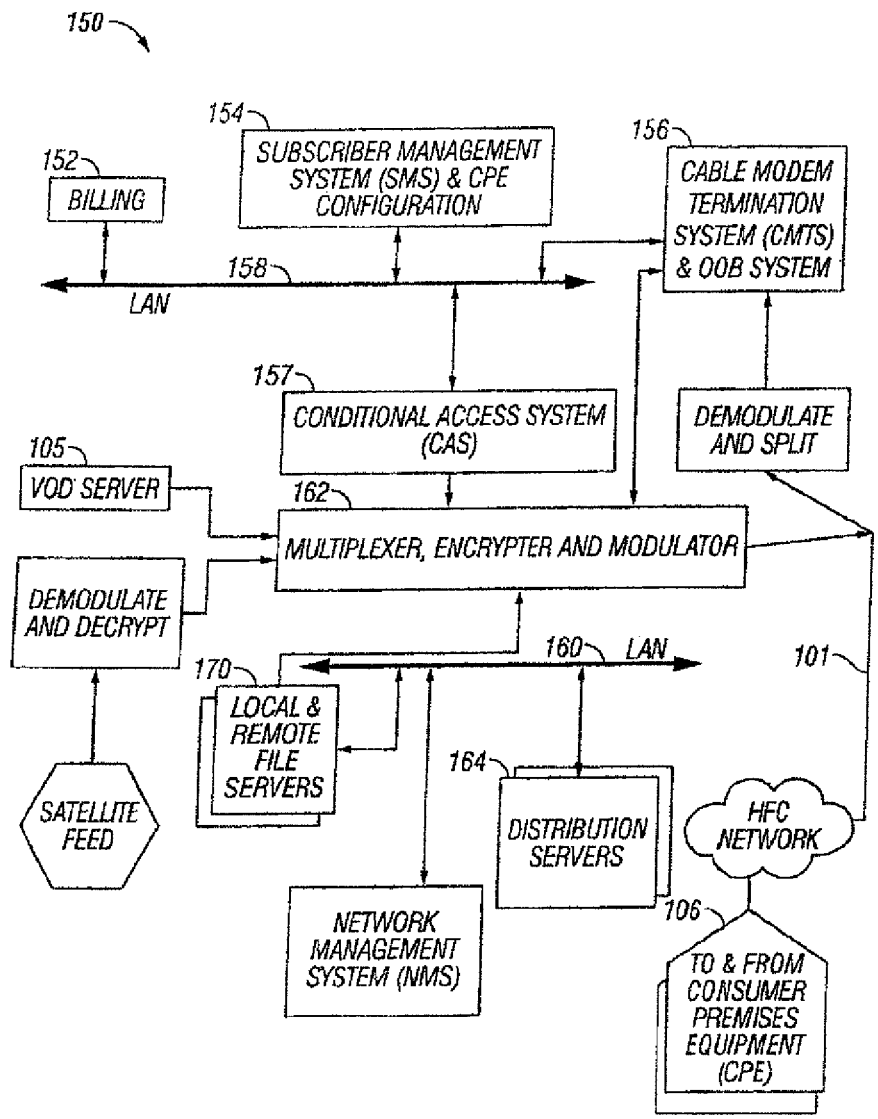
FIG. 1a is a functional block diagram illustrating one exemplary HFC cable network headend configuration useful with the present invention.

Referring now to FIG. 1*a*, one exemplary embodiment of a headend architecture useful with the present invention is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1*a* is high-level, conceptual architecture and that each MSO may have multiple headends deployed using custom architectures.

Figure 1B:
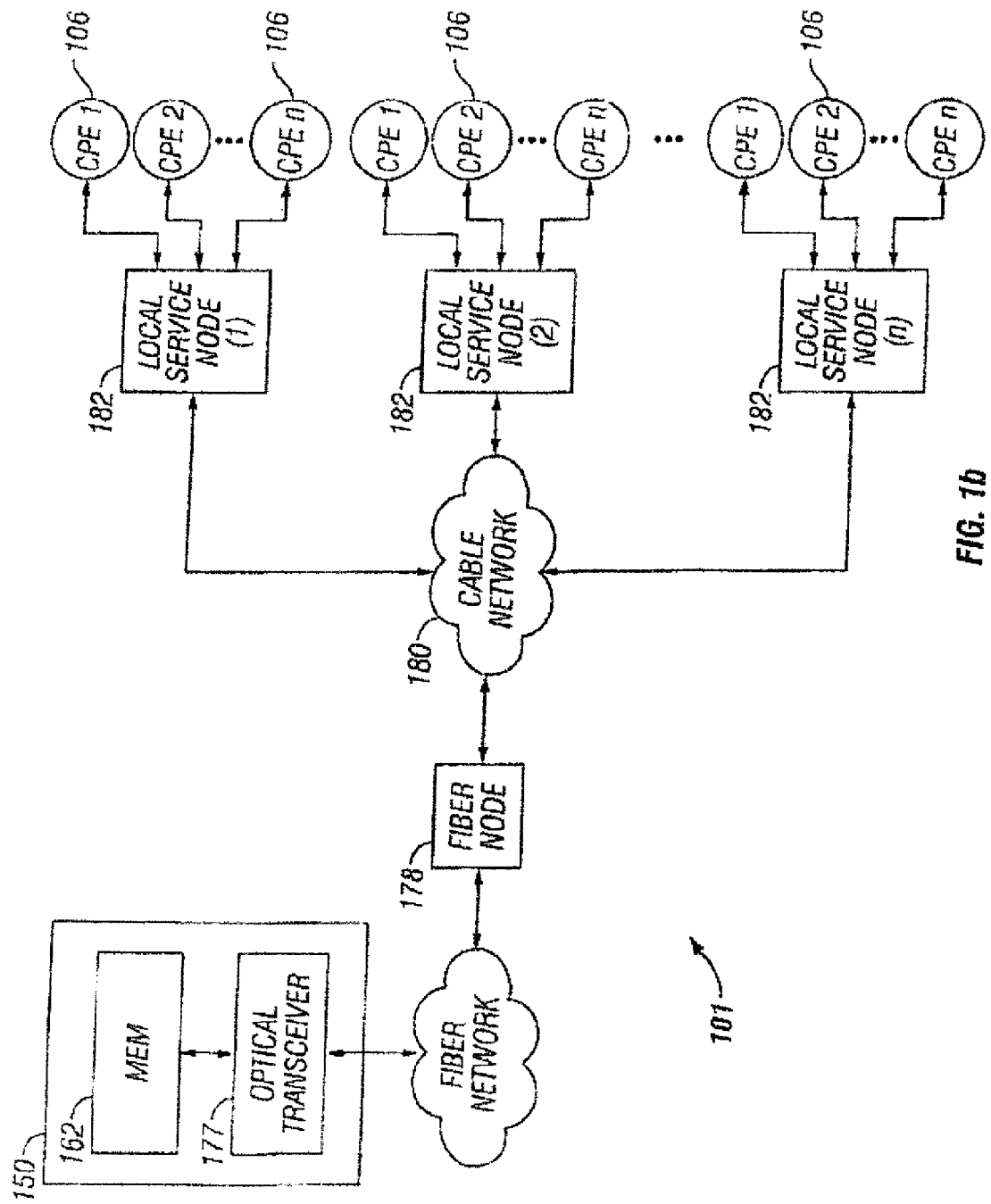
FIG. 1b is a functional block diagram illustrating one exemplary local service node configuration useful with the present invention.

The exemplary architecture 150 of FIG. 1*a* further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1*b*) via a variety of interposed network components.

Figure 1C:
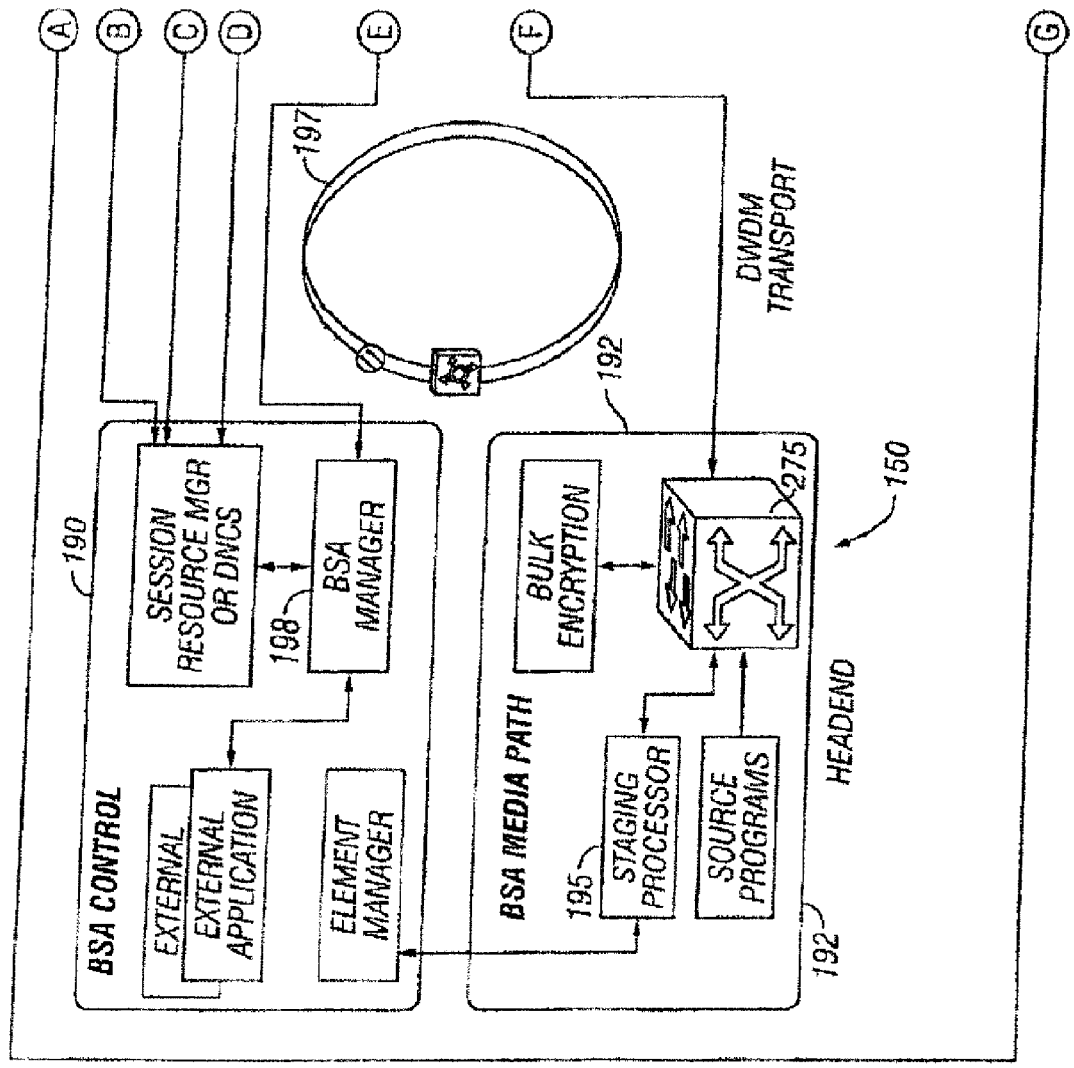
FIG. 1c is a functional block diagram illustrating one exemplary broadcast switched architecture (BSA) network useful with the present invention.
Figure 1C:
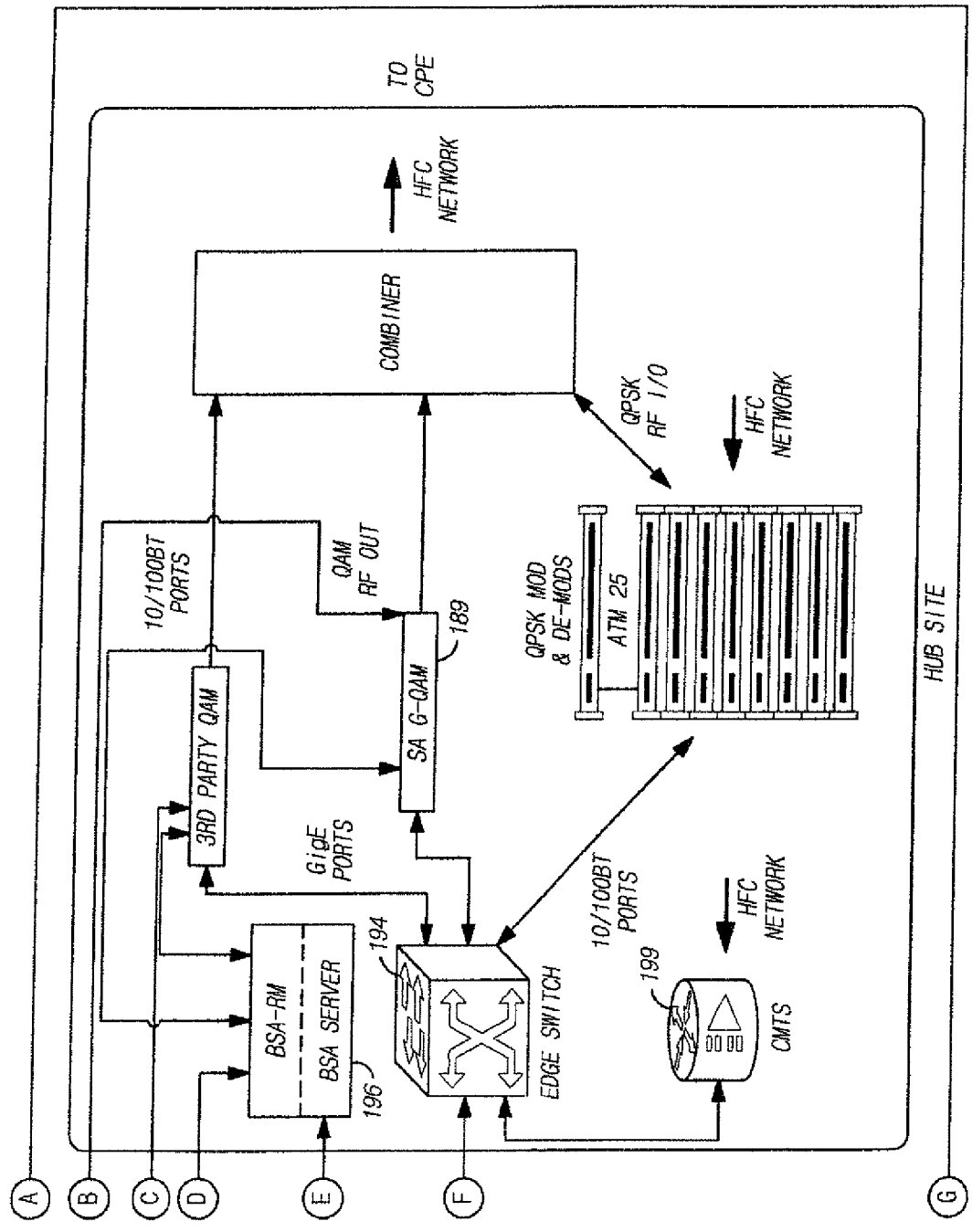

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1*c* provided subsequently herein). As yet another alternative, a multi-location or multi-stage approach can be used, such as that described in U.S. Pat. No. 7,602,820, issued Oct. 13, 2009 and entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols, The OCAP 1.0, 2.0, 3.0 (and subsequent) specification provides for exemplary networking protocols both downstream and upstream, although the invention is in no way limited to these approaches.

"Switched" Networks—

FIG. 1*c* illustrates an exemplary "switched" network architecture also useful with the premises gateway apparatus and features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1*c* shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1*a* and 1*c* (and FIG. 1*d*, described below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG—or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
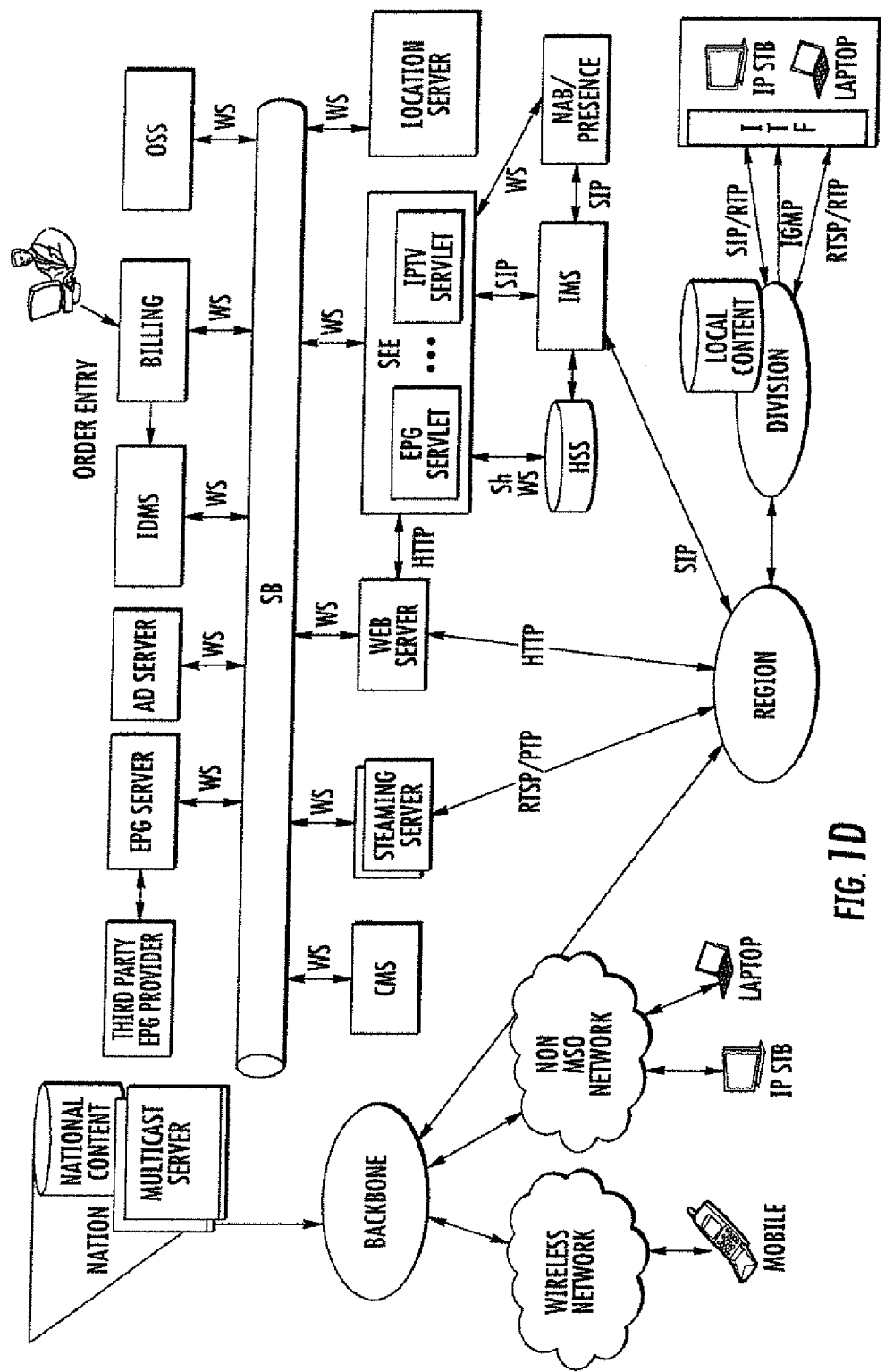
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in U.S. patent application Ser. No. 12/764,746 filed on Apr. 21, 2010 and entitled "METHODS AND APPARATUS FOR PACKETIZED CONTENT DELIVERY OVER A CONTENT DELIVERY NETWORK, incorporated herein by reference in its entirety. Such a network provides significant enhancements in terms of, inter alia, common control of different services, implementation and management of content delivery sessions according to unicast or multicast models, etc.; however, it is appreciated that the various features of the present invention are in no way limited to any of the foregoing architectures.

Exemplary Premises Network Architecture—

Figure 2:
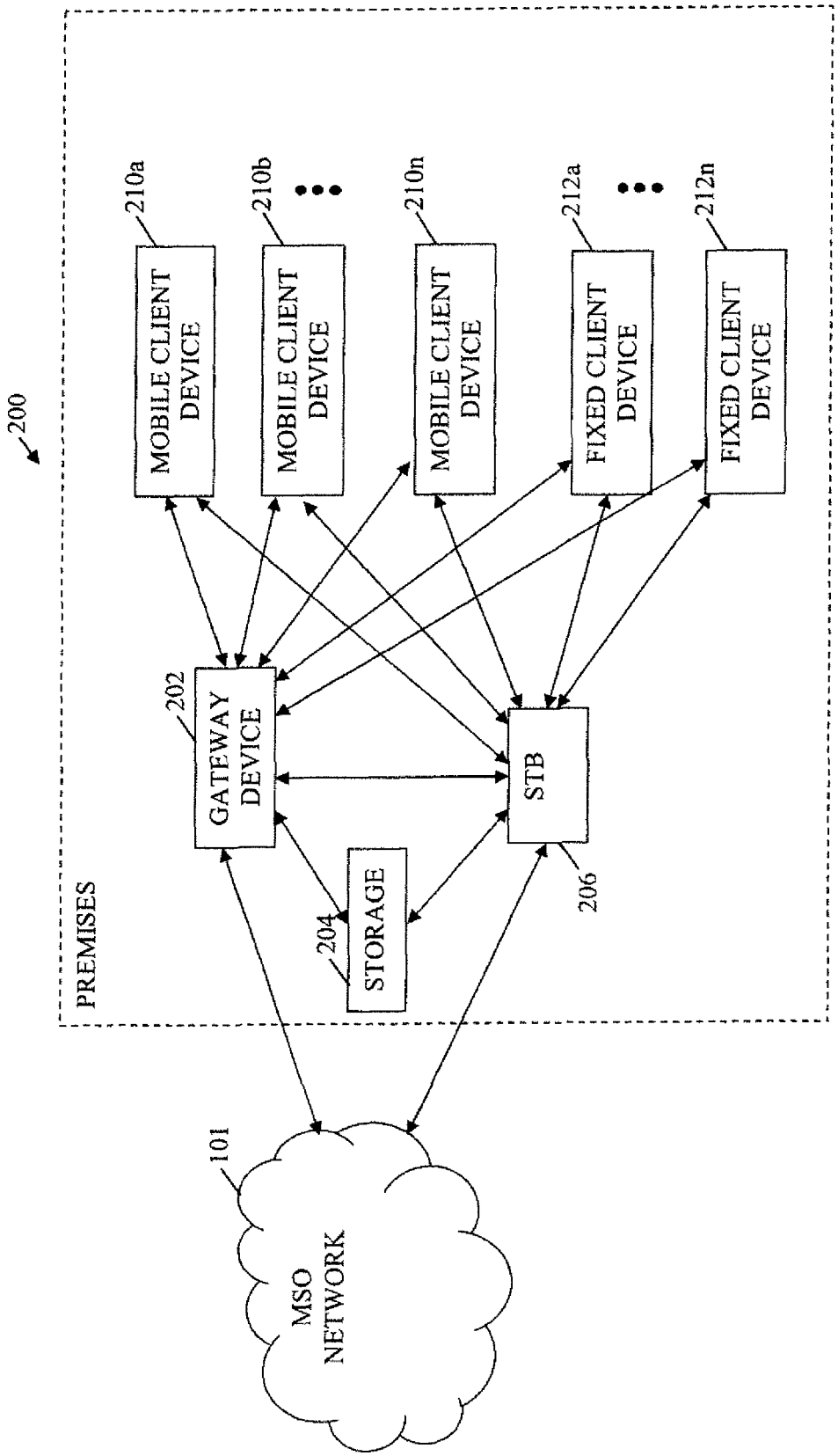
FIG. 2 is a functional block diagram illustrating one exemplary embodiment of a premises network architecture for enabling location identification services.

Referring now to FIG. 2, an exemplary embodiment of a premises network architecture 200 for providing location identification services according to the present invention is illustrated. It will be appreciated that the architecture 200 of FIG. 2 can be used in conjunction with any of the foregoing network content distribution architectures (i.e., those of FIGS. 1-1d discussed supra), or can form the basis of its own distribution and delivery architecture.

As illustrated, the network 200 generally comprises a gateway device 202, a storage entity 204, a plurality of mobile client devices 210a-210n, and a plurality of fixed location client devices 212a-212n. In the illustrated embodiment, the network 200 also comprises a client set-top box (STB) 206. The gateway device 202 and STB 206 communicate with the content delivery network 101, as well as to each of the client devices 210, 212 as discussed in greater detail below.

Each of the foregoing components cooperates to provide location identification and other location-based services to the mobile client devices 210 and/or the fixed client devices 212.

In one embodiment, location identification services are provided via the gateway device 202 and utilize beamforming technology as set forth in IEEE standard 802.11ac™ entitled "*Very High Throughput 5 GHz*", previously incorporated herein by reference in its entirety.

As a brief aside, beamforming is a signal processing technology that is used to direct the reception or transmission (the signal energy) on a transducer array in a chosen angular direction (i.e., directional signal transmission or reception). Beamforming concentrates the array to sounds coming from only one particular direction to listen to signals in one direction and ignore signals in other directions, such as by combining elements in the array in such a way that signals at particular angles experience constructive interference while others experience destructive interference, akin to the well known "phased array". Devices leveraging beamforming technology are therefore able to focus wireless signals directly to a particular device, as opposed to wireless hotspots which "radiate" wireless signals indiscriminately. In other words, beamforming technologies enable a wireless access point to recognize devices that need wireless access and focus the wireless signals directly to the device or devices which need them. By utilizing beamforming technologies, the gateway 202 is able to beam signals around corners and through walls.

In one embodiment, the exemplary gateway device 202 takes advantage of the multiple transmit antennas available in a multiple-input multiple-output (MIMO) system. Signals are sent between multiple antennas of the gateway device 202 and client devices 210, 212; the signals are coordinated to combine constructively at the device receiving the signal (either the gateway device 202 or client devices 210, 212). Specifically, using beamforming technology, for each client device 210, 212, the phases of the transmit signals are manipulated to improve directivity thereto. Efficient steering of individual streams in such a system provides overall signal gain. This can be achieved through knowledge of the channel between the transmitter and receiver. As will be discussed below, information may be extracted during this process which is used to identify a location within a user's premises. For example, various data relating to the signal quality and amplification needed to transmit signals to and/or receive signals from individual ones of the devices 210, 212 is collected. The data may include e.g., Wi-Fi channel state, RF power, delay, signal phase, signal quality, amplification, etc. The data is then used to estimate a location of a device 210, 212 (such as based on comparison to previously gathered data and/or standard or reference data).

In another embodiment, in addition to or as an alternative to the beamforming technologies utilized by the gateway device 202, location-based services are provided by leveraging infrared (IR) ports or other short-range wireless technology on a set-top box (STB) 206. According to this embodiment, IR signals are broadcast from the client devices 210 to the STB 206; the STB 206 or gateway 202 then correlates the signals to a location within the premises (i.e., the known location of the STB 206). In other words, the location of the STB 206 is known by the gateway device 202. Thus, when a signal is broadcast from the client device 210 to the STB 206 and is re-broadcast to the gateway 202, the gateway 202 is able to associate the device 210 to the known location of the STB 206 which re-broadcast the signal.

The client devices 210, 212 of the exemplary network 200 of FIG. 2 may comprise mobile devices 210 (i.e., devices which may move within a premises) as well as fixed devices 212 (i.e., devices which are associated to a single, static location). Any of the herein-described mechanisms for identifying a location of a mobile device 201 may also be utilized to determine the location of the fixed devices 212. Given, however, that these devices are generally located in a specific location (i.e., are moved less frequently if at all), once a location of each is captured in the premises database 204, it may be identified by the system as not being changed (or being changed infrequently). For example, an STB 206 may be labeled to be located in a specific room. The location of the STB 206 may be queried periodically given that the device may be moved, though will not likely be moved often. Once determined, the location of e.g., motion sensors and other static devices 212 are also configured to be stored at the storage entity 204 and identified as being immobile (i.e., designated as being fixed to a particular location therefore not requiring periodic querying).

As will be discussed elsewhere herein, an exemplary profiling process is performed for each designated location within a premises. In one embodiment, a user uses a Location Profiler (LOCP) application to establish a "qualifier" for specific locations in a premises. The LOCP utilizes an initial profile process to gather data regarding devices at the specific locations within the premises. The qualifier (which includes a location name) is then associated to the devices by the LOCP when the device is at the particular location. The gateway 202 (and/or STB 206) is then able to automatically provide a location name to the devices 210, 212 when providing location services thereto.

The following exemplary methods may be utilized (alone or in combination) to enable the gateway 202 and/or STB 206 to learn device locations and enable location-based services.

Exemplary Location-Based Services Method—

Figure 3:
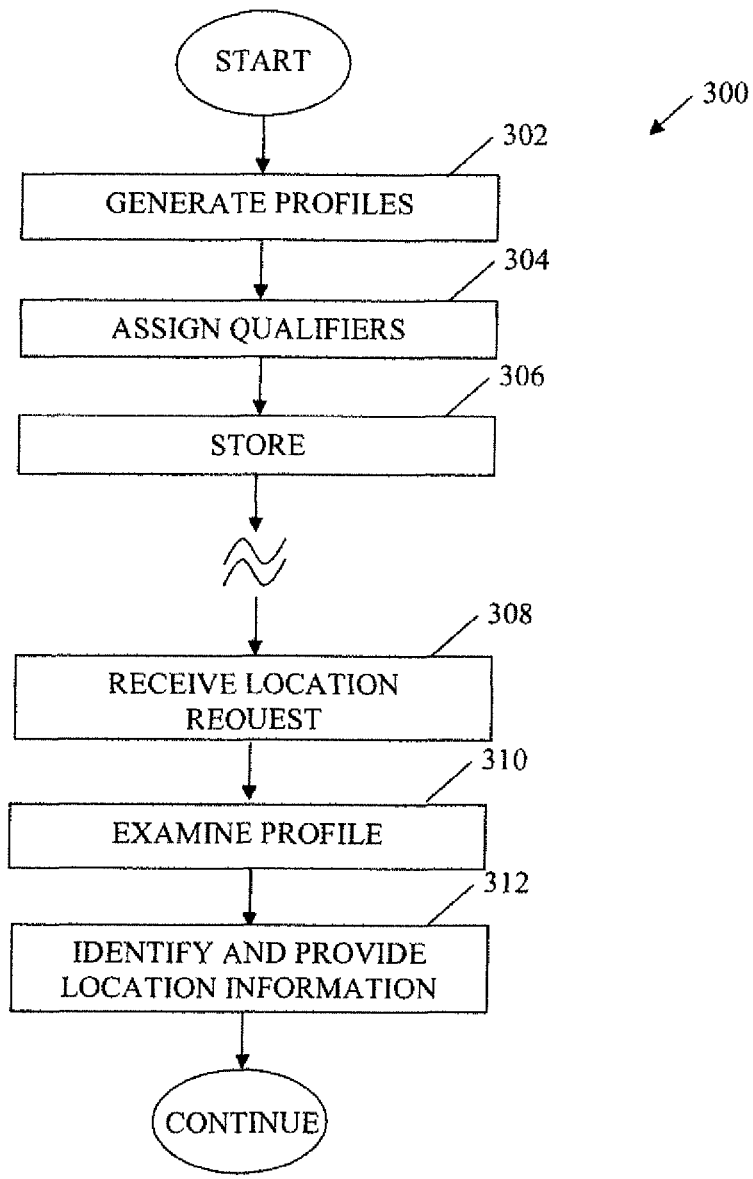
FIG. 3 is a logical flow diagram illustrating an exemplary embodiment of a method for enabling location identification services.

FIG. 3 is a logical flow diagram illustrating an exemplary embodiment of a method 300 for enabling location identification services. As shown, the method generally comprises generating a plurality of location profiles (step 302) such as via the gateway 202 and/or STB 206. Location profiles comprise a plurality of data received from a device 210 when the device 210 is located at a particular location within a premises. Various methods may be utilized to generate location profiles (see discussion of FIGS. 4 and 7 below).

Next, at step 304, a qualifier is assigned to each location. For example, in a user premises, the locations may be assigned qualifiers such as "kitchen", "family room", "dining room", "bedroom", etc. It is further appreciated that each location may be associated with more than one location profile. For example, if a family room is particularly large, the user may seek to generate a location profile for multiple spots within the family room (such as e.g., all four corners, etc.) to enable the system to adequately outline the borders of the room and therefore estimate when a device 210, 212 is within a given room more accurately. The user can then identify each profile as belonging to the family room (such as by labeling them "family room-1", "family room-2", etc.). The profiles with assigned qualifiers are then stored (step 306) at e.g., the storage entity 204.

Moreover, in "open" building architectures such as those where the boundaries between particular rooms are less salient, wireless accessibility to devices may occur from multiple locations (e.g., from one "room" to another).

At step 308, a location request is received at the gateway 202 and/or STB 206. The location request may be received in the context of an application running on a client device 210, 212. For example, an application may be running on the device which causes other applications on the device to load based on what room of a home a mobile device 210 is currently in. In one example, a recipe application, grocery shopping list application, and/or other cooking-related applications are automatically loaded on e.g., the user's mobile device 210 (such as e.g., an iPad®) when it is determined that the device is in the kitchen. In order to cause the appropriate applications to load, the application running on the mobile device 210 sends a request to the gateway 202 querying what room it is in periodically. The request can also be triggered upon an event, such as for example motion within the mobile device (e.g., using an extant accelerometer or other comparable device) indicating that the user is on the move, and hence an update is required. This latter approach in some cases saves mobile device battery power, since the transponder (e.g., Bluetooth, Wi-Fi, or other radio interface) need only wake up and transmit when motion is detected.

In another example, an energy-saving application running on the mobile client device 210 may cause non-essential or otherwise identified electronic devices to be shut down (or placed in a "sleep" mode) when the user is no longer in the vicinity of the devices. For instance, a user may carry a mobile device 210 on his/her person; when the user walks out of the living room and is gone for a pre-determined period of time, devices in the living room may be shut down (such as e.g., a television, lights, etc.). This is accomplished by the mobile device 210 application periodically (or otherwise) transmitting a location request to the gateway 202. These and other exemplary location-based services useful with the present invention will be discussed in greater detail below.

In another alternative, an application running on the gateway 202 itself may request that one or more devices in the premises be located as discussed herein, such as on an periodic or event-driven basis.

Per step 310, the gateway 202 examines the stored profiles to determine a location from which the request originated. Alternatively, the gateway 202 pings the devices of interest and awaits a return message, which is compared to the stored information at step 310. The location is identified and provided to the requesting device (such as to an application running on the mobile device 210 or running on the gateway 202 or STB 206) at step 312. It is appreciated that, in one embodiment, the user of the requesting device may be provided with the identified location (such as via a user interface). The user may be given an opportunity to affirm a correctly identified location and/or manually select a correct location in the instance the identified location is incorrect. Additionally, the system may be configured to "learn" locations as entered by a user. In other words, at the time a user manually enters a location, the gateway 202 may be configured to use the previously received information (from the location request and/or the ping response) or may ping the device 210 and use information extracted from the device response message to override any previously stored profile information for the user-entered location.

The foregoing concept can be extended to enable the application to speculate on the user's next location as well. For example, as discussed in greater detail below with respect to FIG. 6, one variant of the application includes a moving "learning mode", wherein the gateway or other designated entity takes frequent measurements of the radio frequency transmissions/environment or other parameters while the user moves from one room to the next (such as down a hallway of the premises), and saves these data as "maps" indicating the user's path of traversal. For instance, a certain pattern of radio frequency signal strength (e.g., RSSI) as a function of time may be indicative of the user traversing the aforementioned hallway from a first end to a second end. By knowing the layout of the house (e.g., that the living room and kitchen are both at the end of the hallway), the gateway can then speculate that the user is going to either the kitchen or living room, and as more measurements are obtained during use, resolve the ambiguity and load the appropriate applications or execute other appropriate functions for that room.

As noted above, various methods may be utilized to generate location profiles (step 302), as will be discussed in greater detail subsequently herein.

Exemplary Device Profiling Methods—

Figure 4:
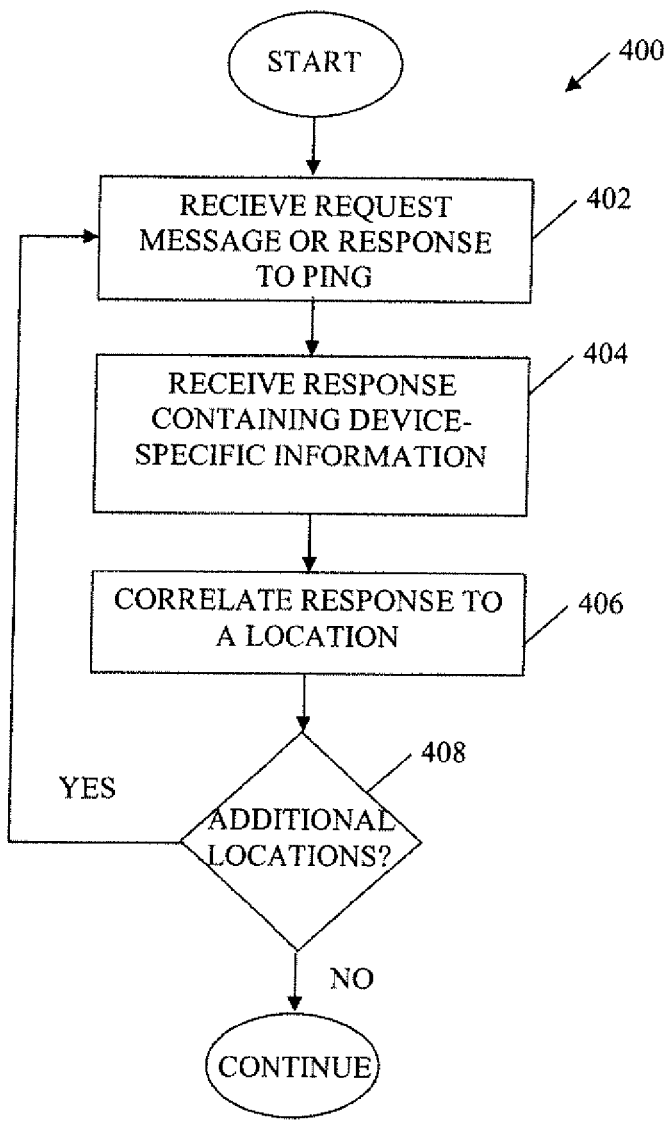
FIG. 4 is a logical flow diagram illustrating an exemplary embodiment of a method of profiling a plurality of devices within a premises.

FIG. 4 is a logical flow diagram illustrating an exemplary embodiment of a method 400 for profiling a plurality of devices 210, 212 within a premises.

Per step 402, a request message is transmitted to a device 210, 212 from the gateway 202. The request message (or "client ping") requests a response from the device 210, 212. At step 404, a response to the request message is provided from the client device 210, 212 to the gateway 202. The response in one embodiment comprises information generally used for beamforming analysis as well as other information useful in characterizing a signal (such as e.g., receiver power, transmitter power, error rate (e.g., BER, PER, etc.), Wi-Fi channel state, RF power or signal strength (e.g., RSSI), delay, signal phase, etc.). Many of these parameters are already measured or determined as part of the extant underlying RF standard (e.g., Wi-Fi), and hence no special measures are necessary in many cases to obtain the parameters for transmission.

In an alternative embodiment, the client device 210, 212 may automatically provide a transmission to the gateway 202 (i.e., without first receiving a request from the gateway), the transmission comprising aforementioned characterization information. Such transmission may be period or event driven (e.g., motion of the device), or according to any other scheme. As noted above, the exemplary IEEE 802.11ac standard provides a mechanism for utilizing the data received at the antenna to a location of the device, although it will be appreciated that this is but one possible implementation of the invention.

Figure 6:
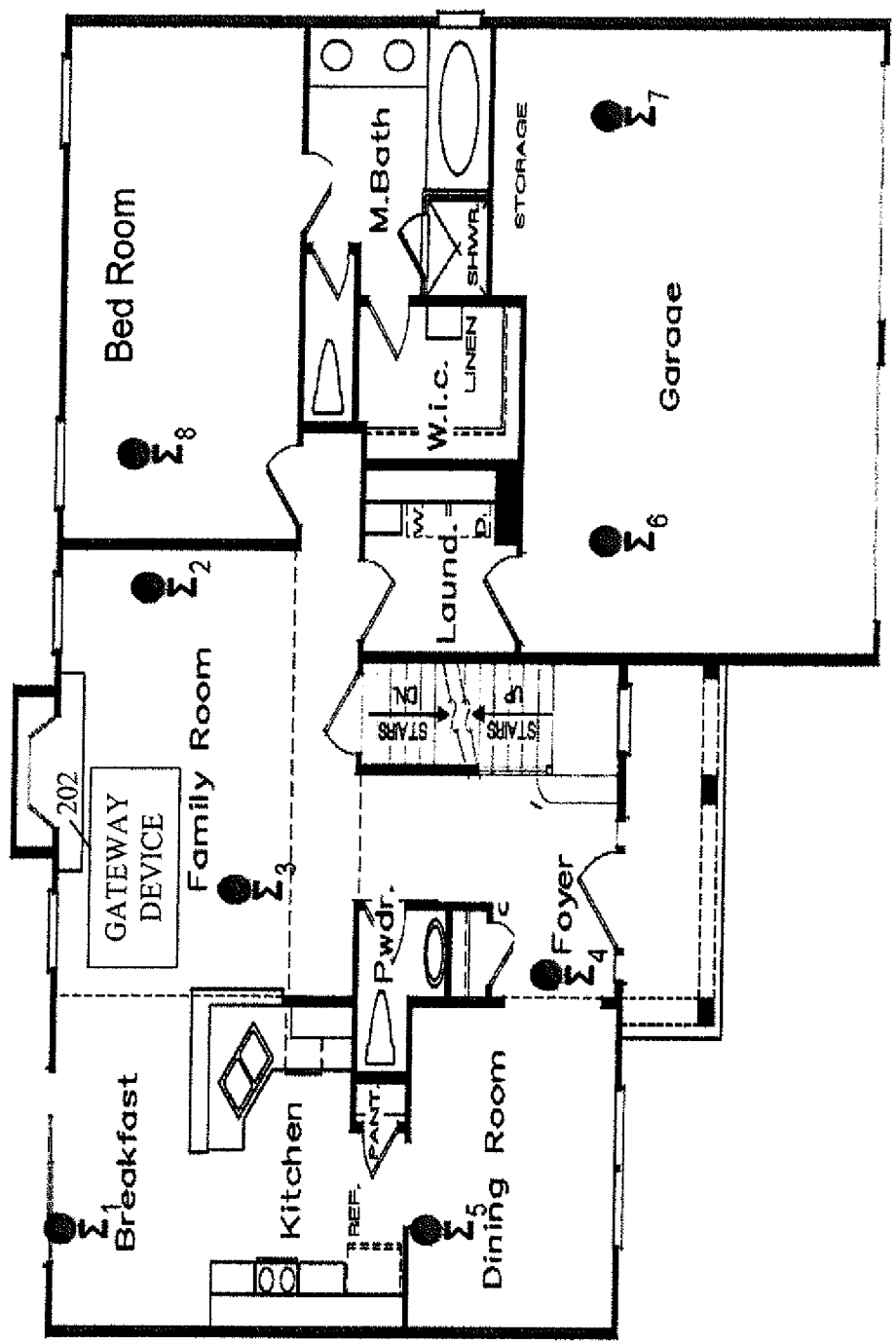
FIG. 6 is an illustration of a consumer premises having one or more locations therein identified according to the method of FIG. 4.

In one embodiment, the gateway 202 comprises a Wi-Fi interface, and the request message (or "client ping") is provided using multiple antennae thereof (e.g., part of a MIMO or other multi-antenna or spatial diversity array), as illustrated in FIG. 5a. In the illustrated example, the wireless router/gateway 202 implements 3 antennas to obtain coverage in a home, which are represented by $\alpha_1$, $\alpha_2$, and $\alpha_3$, although it will be appreciated that any number of antennas may be used consistent with the prevailing technology used in the implementation The response, as illustrated in FIG. 5b, is received from the device 210 at all three antennas. The exemplary response message comprises information relating to the antenna receive power (pr), the error rate (er), and the client transmit power (pt), etc. The information extracted from the device response received at all three antenna is referred to as the device's "antenna profile". The antenna profile, $\Sigma$, (see FIG. 6) for each device 210 is used to map the device 210 in different locations of the home. For example, as illustrated in FIG. 6, a family room may have multiple profiling locations ($\Sigma_2$ and $\Sigma_3$) which are taken together to accurately map the living room (i.e., enable the system to create a logical border of the room with respect to other rooms of the home).

In one embodiment, an antenna profile is generated for each device at each location within a premises (the locations being for example designated by the user). When a particular device sends a request for location-based services (see e.g., FIG. 3), that particular device's profile or "signature" is referenced in order to determine a location of the device. Alternatively, a single device's antenna profile may be utilized by the gateway to establish boundaries of each room in a home. Thereafter, the antenna profile of any device which requests location-based services is referenced to the antenna profile of the first device which was used to establish the borders of a room in order to determine a location of the requesting device.

At step 406, application data is used to associate the location information or antenna profile to a particular location (e.g., the room or location name in the home). In one variant, a steering matrix or table is created using the antenna profile information. An exemplary steering table is illustrated in Table 1 below. The steering table enables the gateway 202 to establish a range of values for each measured characteristic (e.g., pr, er, pt, etc.) for each antenna (e.g., $\alpha_1$, $\alpha_2$, $\alpha_3$, etc.); the range of values is established to include all possible values which may be received when a device is within a given location (e.g., family room, bed room, kitchen, etc.). Therefore, the steering matrix may be generated based on information received from the devices, while taking into consideration an acceptable tolerance range outside a received value. The steering matrix may be further comprised of transmitter and receiver characteristics covering the Wi-Fi channel state, RF power, delay, signal phase, signal quality, amplification, etc. Other profiling information may include information regarding a nearby Wi-Fi hotspot (such as a neighbor's Wi-Fi hotspot or AP). The combination of this information for the same client device 210 from multiple antennas may then be used for providing location-based services.

TABLE 1

| Location | Antenna 1 ($\alpha_1$) | Antenna 2 ($\alpha_2$) | Antenna 3 ($\alpha_3$) |
| --- | --- | --- | --- |
| Family Room | [pr, er, pt] | [pr, er, pt] | [pr, er, pt] |
| Bed Room | [pr, er, pt] | [pr, er, pt] | [pr, er, pt] |
| Kitchen | [pr, er, pt] | [pr, er, pt] | [pr, er, pt] |

The gateway 202 then stores the location information $\Sigma$, for that client (comprised of the information from each antenna profile as correlated to a particular location), into a location database 204, such as on a storage device of the gateway 202. As noted previously with respect to FIG. 3, the location database 204 is consulted by the gateway 202 when a location request is received to associate the device 210 to a particular location (e.g., a room in the home). The gateway 202 tracks a client in those locations based on the steering matrix. In other words, when a response message is received from a device 210, the characteristics of the response are compared to all three ranges for each antenna to determine the location of the device in the illustrated embodiment.

Next, at step 408, it is determined whether a profile should be generated for any additional locations. If additional locations are needed, the process begins again at step 402.

Although discussed herein with respect to generating antenna profile for mobile devices 210, it is appreciated that the herein-described methods may also be utilized to generate antenna profile for fixed devices 212 where necessary. Such methods are further configured to indicate (such as in the steering table) that antenna profile of fixed devices 212 need not be collected regularly (i.e., may be conducted less frequently, only upon installation or startup, etc.).

In another embodiment, more antennas may be placed within a premises thereby increasing the amount of data collected by each response message which in turn enables the system to more accurately predict a location of a device 210. In one variant, the additional antennas may be placed within the same gateway device 202 and controlled thereby. Alternatively, additional antennas may be stationed within one or more second gateway devices 202 or other entities placed elsewhere in the premises. The one or more second gateway devices 202 are in communication with and controlled by the primary or master gateway 202.

In yet another variant, one or more stand-alone antenna devices may be placed in various locations throughout the premises. The one or more stand-alone antennas are in communication with the gateway 202 and communicate therewith via e.g., wireless (e.g., UWB), wired (e.g., CAT-5) or fiber optical connections.

A higher resolution for determining a device location may also be provided by increasing the sounding frequency (i.e., the frequency with which the gateway 202 pings devices 210 in the premises). This approach may be implemented both during use and during the optional "learning mode" (discussed supra), so as to increase the granularity of the location determination.

In yet another embodiment, the system is further configured to generate dynamic or moving profiles. In other words, the gateway device 202 characterizes movement or predictable pathways within a premises. For example, in the illustration of FIG. 6, the system will not expect to see movement of a mobile device 210 directly from the breakfast area to the bedroom (in that the two are not physically proximate). Rather, the gateway 202 is configured to learn that a predictable pathway includes a trip from the breakfast area, through the family room, down the hallway, and on to the bedroom. In order to obtain the requisite information to generate moving profiles, the gateway device 202 uses constant or continuous pinging (or otherwise high frequency pinging). The device 202 further employs one or more applications configured to analyze information extracted from the device 210 return messages over time to generate one or more rules for which rooms within a premises are near one another. Using the dynamic or moving antenna profiles, a likely destination of the device within the premises can be derived or speculated, and further resolved as additional measurements are taken during use. This "moving" mode can also be triggered by movement of the device itself; e.g., using the extant accelerometer(s) of the mobile device, Doppler effect, GPS data, or other mechanism for detecting movement of the mobile device.

It is also appreciated that while many of the embodiments set forth herein are described in terms of an indoor paradigm (e.g., within a house, office building, shopping mall, etc.), the various aspects of the invention are in no way so limited, and may readily be applied to outdoor or hybrid indoor/outdoor applications.

It is further noted that the generated profiles may be correlated to a particular time of day and/or day of the week, or user context. For instance it may be noted that between 6:00 PM and 8:00 PM on weekdays, the user is generally found in the family room. Hence, the system can predicatively load applications and/or provide content (such as network 101 content, DVR content, etc.) designated or related to the predicted location. Likewise, it may be known that a user is typically working at home on Mondays and Fridays between 9:00 AM and 5:00 PM, and hence uses during that time period are likely business related, and hence applications or content loaded for those times can likewise be business-related in nature. At other times, the "context" changes to personal uses, and hence at least some different applications and/or content choices are provided to better suit the personal context.

Moreover, the "premises" may in fact be a workplace, and hence the contexts may be e.g., "in a meeting" (e.g., when in the main conference room of the business), "at my desk" (when in their own personal office), and so forth. The same mobile device may also traverse different premises, such that the aforementioned work-related contexts are all available when the user is at work (first premises), and the "personal" contexts are available when the user is physically located at their home (second premises).

Context may also be derived from user actions or events, or even affirmative user inputs. For instance, the user's invocation of a particular application dealing with one context (e.g., something work-related, such as a client-specific billing program) can be used as an indirect indicator of context, or at least one input to a decision process which determines context based on multiple factors such as time of day, location, etc. Hence, the user's interface (or other aspects, such as contents of an EPG, on-screen display, content availability/choices, etc.) can then be adjusted to suit that context. For example, if a work context is identified, the user's EPG choices may be geared towards more informational channels (e.g., CNN, Financial news, instructional or educational programming, etc.), whereas a personal context would be geared more towards entertainment or the like. A VoIP call or email directed to or received from someone listed in the user's "work contacts" directory or email client might also invoke the "work" context.

As another example, a user's mobile device may be configured to receive user input (such as touching a software-generated icon on a touch-screen display) to indicate a status or context (e.g., "at work" or "down time"), akin to user status identifiers associated with extant chat or messaging programs such as Yahoo® Instant Messenger or the like. Depending on context, the user's mobile device 210 (e.g. an application running thereon) can identify the context and implement loading of one or more other applications, functions, content, or features applicable to that context. In another variant, the determined context can be forwarded to the gateway 202, the latter which signals the STB or other entity regarding content or menus to be provided the user on a rendering device (e.g., configuring EPGs or on-screen displays based on the user's context (and/or location). In one such scenario, the user using their tablet computer selects "at work" as their current context, and this information is passed to the gateway (and various DSTBs distributed throughout the user's premises.

It is further appreciated that a user's mobile device may apply a passive status or context to the user based on inactivity and lack of movement. For example, when it is determined that a particular device (and therefore user) is located in a bedroom, and no activity has occurred or action has been taken with respect to the devices in that bedroom, it may be inferred that the user is asleep or occupied outside of his/her devices, and therefore the settings of the devices may be adjusted accordingly. For example, based on a time of day, devices may be shut down automatically upon user inactivity, or set to sleep mode; other settings may also be altered such as to decrease volume and/or brightness, etc. These settings may also be configured to be altered (e.g., all or portions of the device or its indigenous processes "woken up" upon detection of movement, touching the screen, detecting certain audible sounds, sensing exposure to light (e.g., the user waking up and turning on the room lights, or opening blinds in the morning), etc.

In a further variant, a lack of moment and/or interaction with client devices for a pre-determined extended length of time (which may vary based on time of day) may be utilized for home health monitoring purposes. That is, upon expiration of an extended period of time with no user activity and/or movement detected, an alert message may be transmitted from the gateway 202 to another device capable of alerting a doctor, neighbor, friend, or family member of the user. The alert may indicate the inactivity period and remind the friend or doctor to call or otherwise check in on the inactive user. Moreover, the client device audio system may be programmed to identify certain acoustic frequencies, patterns, etc. that correspond to a need for assistance; e.g., sounds corresponding to extended coughing, screams, or the word "help" recognized by a speech recognition system may also be used to trigger responses such as wake-up, transmission of a message, dialing 911 via e.g., a VoIP telephony connection, etc.

In another variant, error rate information may be obtained while data is being delivered to the mobile device 210. Generally, error rate information is used to determine whether a change in coding scheme is necessary in order to more effectively provide data services to a mobile device 210. However, in the exemplary embodiment of the present invention, the error rate information may be further used to determine when a device 210 is moving within a premises. When the device 210 is moved from a location which data delivery has been optimized for, the error rate may change; this change in error rate can be used to indicate device movement to the gateway 202. Error rate statistics over time may be correlated to a location or pathway as discussed above. For example, if movement between rooms A and B historically affects device performance according to a first profile, when the gateway 202 recognizes performance degradation according to the first profile, it can predict subsequent location.

Figure 7:
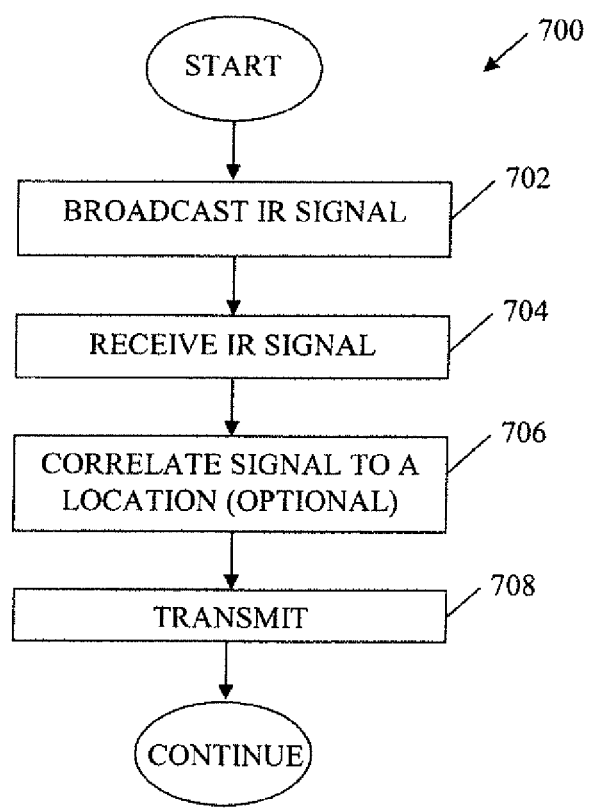
FIG. 7 is a logical flow diagram illustrating a second exemplary embodiment of a method of profiling a plurality of devices within a premises.

Referring now to FIG. 7, a second exemplary method 700 of profiling a plurality of devices within a premises is illustrated. As shown, an infrared (IR) signal is broadcast from a mobile device 210 to an STB 206 at step 702. In other words, an IR transmitter of the devices 210 broadcast a fixed message over a fixed interval of time having an embedded unique identifier. For example, the devices 210 may broadcast an identifier (such as an "ID" or "NAME"). The frequency with which the device 210 transmits a beacon may be adjusted (such as by a user of the device 210), or by a power conservation/sleep mode of the device (e.g., one which only broadcasts when the device's accelerometer detects movement, a prescribed device attitude or orientation, etc.). In one variant, since many mobile devices do not carry indigenous IR (e.g., IRdA or the like) sensors or transmitters, add-on or aftermarket IR interfaces are envisaged, such that a user can simply attach one to their client device at an appropriate location in order to provide such capability. For instance, a stick-on or similar device can be used, wherein the add-on device includes in one variant an RF interface suitable for use with a Bluetooth, NFC, or other wireless RF interface already present on the client. In this manner, the wireless RF generates a command or message that is received by the wireless RF receiver of the add-on device, which then "translates" that command or message into an appropriate protocol and transmits it over the IR interface.

Figure 8:
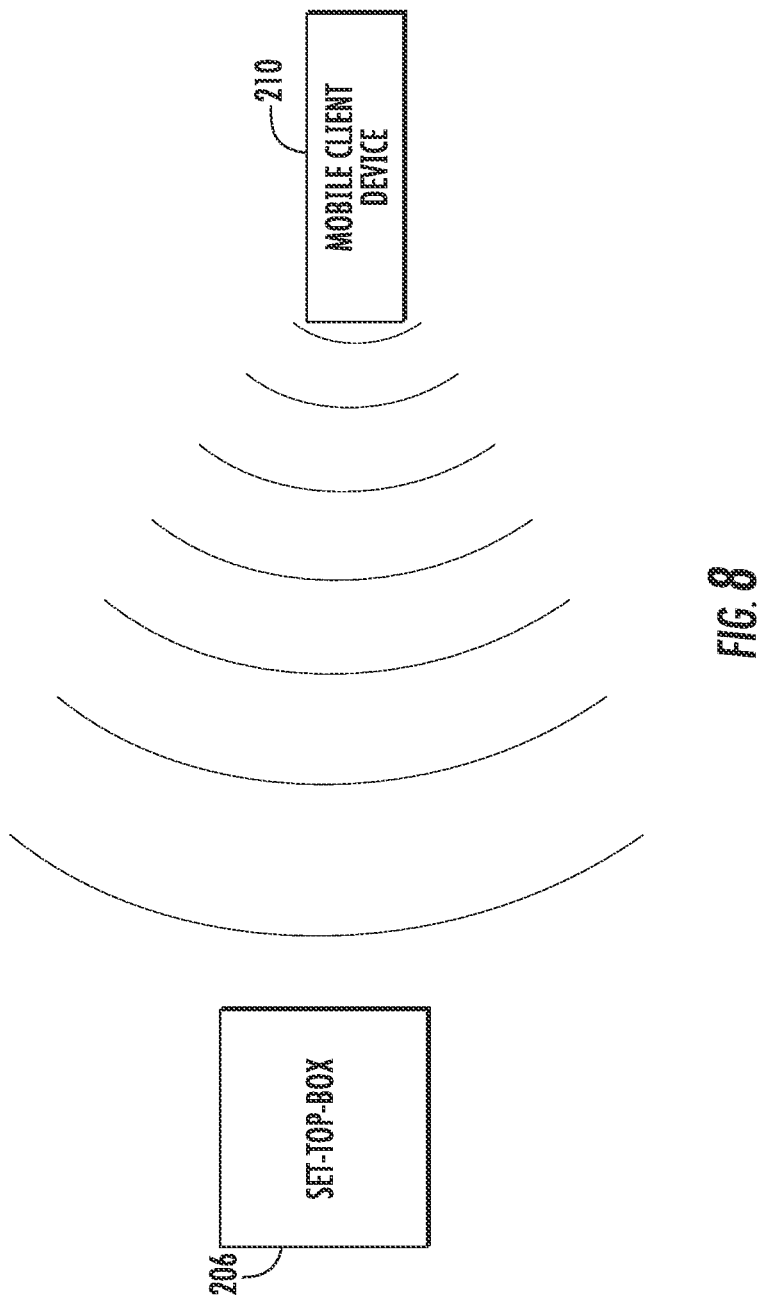
FIG. 8 is an illustration of an exemplary communication useful in performance of the method of FIG. 7.

At step 704, the IR signal is received at an IR receiver of the STB 206. The STB 206 can automatically identify the presence of any device 210 within its line of sight or range. FIG. 8 illustrates the communication of the IR signal from the device 210 to the STB 206.

The STB 206 is in this embodiment associated with a room; hence, when the STB 206 receives the IR signal, it can optionally automatically assign a location to the device (i.e., the known location of the STB 206) as per step 706. In other words, prior to re-transmitting the signal received from the device 210 to the gateway 202, the STB 206 can attach information identifying the location of the STB 206 thereto. In this manner, when the re-transmitted signal is received at the gateway 202, it will have enough information to enable the gateway 202 to identify the device 210 and associate it to a location (i.e., the location of the STB 206). Alternatively, the correlation or association of the device 210 to the known location of the STB 206 may be performed at the gateway 202. The gateway 202 may be provided (in the re-transmitted signal) information identifying the device 210. The gateway 202 additionally uses information in the re-transmitted signal to identify the STB 206 from which the signal came, then, based on information already known to the gateway 202 about the location of the STB 206, the gateway 202 can assign a location to the device 210.

The device 210 location (or alternatively a retransmission of the IR signal indicating the device 210 identity and the STB 206 identity) is then transmitted from the STB 206 to the gateway 202 (step 708), Transmission may occur wirelessly, such as over Bluetooth, UWB, etc. or via a wired connection such as a CAT-5 cable, coaxial cable (e.g., MoCA arrangement), or other medium. In this manner, IR is used to automatically sense the location of a device 210.

The gateway 202 further correlates the message received from the STB 206 (i.e., the retransmission of the message originally sent from the mobile device) with the steering profile of the client device 210 (identified in the signal) to automatically associate any messages from that STB 206 to a particular (i.e., known) location. The gateway 202 may store the transmitted information at the storage entity 204 in the place of or in addition to a previously generated profile for that device 210. In other words, the profile of signal characteristics is not affected by the IR signal retransmission; rather, the location is simply stored as a current location of the device 210. The current location information is not permanent, but rather as additional IR signals are received and analyzed by the STB 206 and transmitted to the gateway 202, the device 210 current location is updated.

In yet another embodiment, additional IR receivers may be established within the premises, each being assigned a particular known location and each being in communication with the gateway device 202 (such as via any of the aforementioned wireless or wired communication mediums). It is appreciated that while discussed herein with respect to a STB 206, the IR receiver may be a component of any number of devices. For example, the IR receiver may be a device having only IR receiver capabilities and transmission capabilities (for communication to the gateway 202).

The foregoing embodiment may be useful, for example, in large public spaces having multiple distinct sub-sections (such as e.g., bookstores, malls, coffee shops, food courts, museums, sports arenas, conventions, job fairs, etc.). The IR mechanism discussed above is particularly useful for enabling close range location-based services. The close-range needed to make use of the IR feature ensures close proximity of the device to a particular booth, store, exhibit, etc. With direct knowledge of a device location within a small distance, content relating specifically to a precise location may be provided (such as e.g., coupons, additional information, updates, etc.).

In yet another embodiment, the applications discussed herein may further make use of a mechanism for identifying a device location based on radio frequency identification (RFID) and/or near field communication (NFC) standards. For instance, the protocols disclosed in *"EPC™ Radio-Frequency Identity Protocols Class-1 Generation-2 UHF RFID Protocol for Communications at 860 MHz-960 MHz*

*Version* 1.2.0" dated Oct. 23, 2008, International Organization for Standardization (ISO)/International Electrotechnical Commission (IEC) standard 18000-3 entitled *"Information technology—Radio frequency identification for item management, Part* 3: *Parameters for air interface communications at* 13.56 *MHz*" Third Edition, dated Nov. 15, 2011, ISO/IEC standard 14443-2 entitled *"Identification cards— Contactless integrated circuit*(*s*) *cards—Proximity cards, Part* 2: *Radio frequency power and signal interfaces*" dated Mar. 26, 1999, and ISO/IEC standard 14443-4 entitled *"Identification cards—Contactless integrated circuit*(*s*) *cards—Proximity cards, Part* 4: *Transmission protocol*" dated Mar. 10, 2000, which are each incorporated herein by reference in their entirety, may be utilized.

In one implementation, the gateway 202 is configured to act as an interrogator with respect to the RF (e.g., NFC or RFID) chips disposed within mobile phones and other mobile or wireless devices (user devices 210). It is appreciated that many devices are currently manufactured to have indigenous NFC chips, however a passive or active RFID tag (including those as a part of an NFC suite) may be provided to a device 210 after purchase thereof. The gateway 202 interrogates all tags (devices) within range to find a device identifier. The range within which the gateway 202 may interrogate may be tuned such as by adjusting the transmit power, receiver sensitivity, operational frequency, or other antenna or transceiver features. In the exemplary passive implementation, each device backscatters the interrogation signal and includes its unique identifier. Subsequently, the gateway 202 may address the individual devices, and read and write to the contents of the memory of each. As noted above, the range of interrogation by the gateway 202 can be manipulated to a known distance. Thus, the gateway 202 may provide information to the devices regarding a means for accessing content which is specific to the particular known location or otherwise providing location-based services thereto. For example, coupons for a nearby business and/or information regarding the particular location (such as movie show times, maps, hours of operation, etc.) may be provided.

It is appreciated that mere response from the interrogated device can be used as an indication of location. For instance, if the effective range of the interrogator at 13.5 KHz is 10 feet, and a given device backscatters the interrogation signal, then it is presumed to be within ten feet of the interrogator, and hence its location is known to that level of precision.

Moreover, so-called "range gating" can be employed, such as where the interrogator has longer, intermediate, and shorter range transceivers or modes. In this case, a first reply at the longer range mode indicates that the responsive device is within the longer range. Hence, a reply to follow up interrogation at the intermediate range (but not to one at the shorter range) indicates that the device is located between the maximum range of the intermediate mode and the maximum range of the shorter mode. Such gating can be used to, inter cilia, further refine a range/position estimate, and to detect movement towards or away from the interrogator (i.e., at least the radial or range component of movement of the mobile device can be resolved).

In yet another embodiment, the well known Bluetooth technology may be utilized for communication between the gateway 202 and a device 210. For instance, data may be exchanged over short distances (using short-wavelength radio transmissions in the ISM band from 2400-2480 MHz) to cause pairing of the gateway 202 and device 210. Thus, when a device 210 is close enough to be paired to the gateway 202, it will be known to the gateway 202 that the device 210 is within a given distance of the device. As discussed elsewhere herein, once the location of the device is known, the gateway 202 may provide location-based services (such as enabling the device to load particular applications, receive information and/or advertisements or coupons targeted to the location, etc.).

Exemplary Gateway Device—

Figure 9:
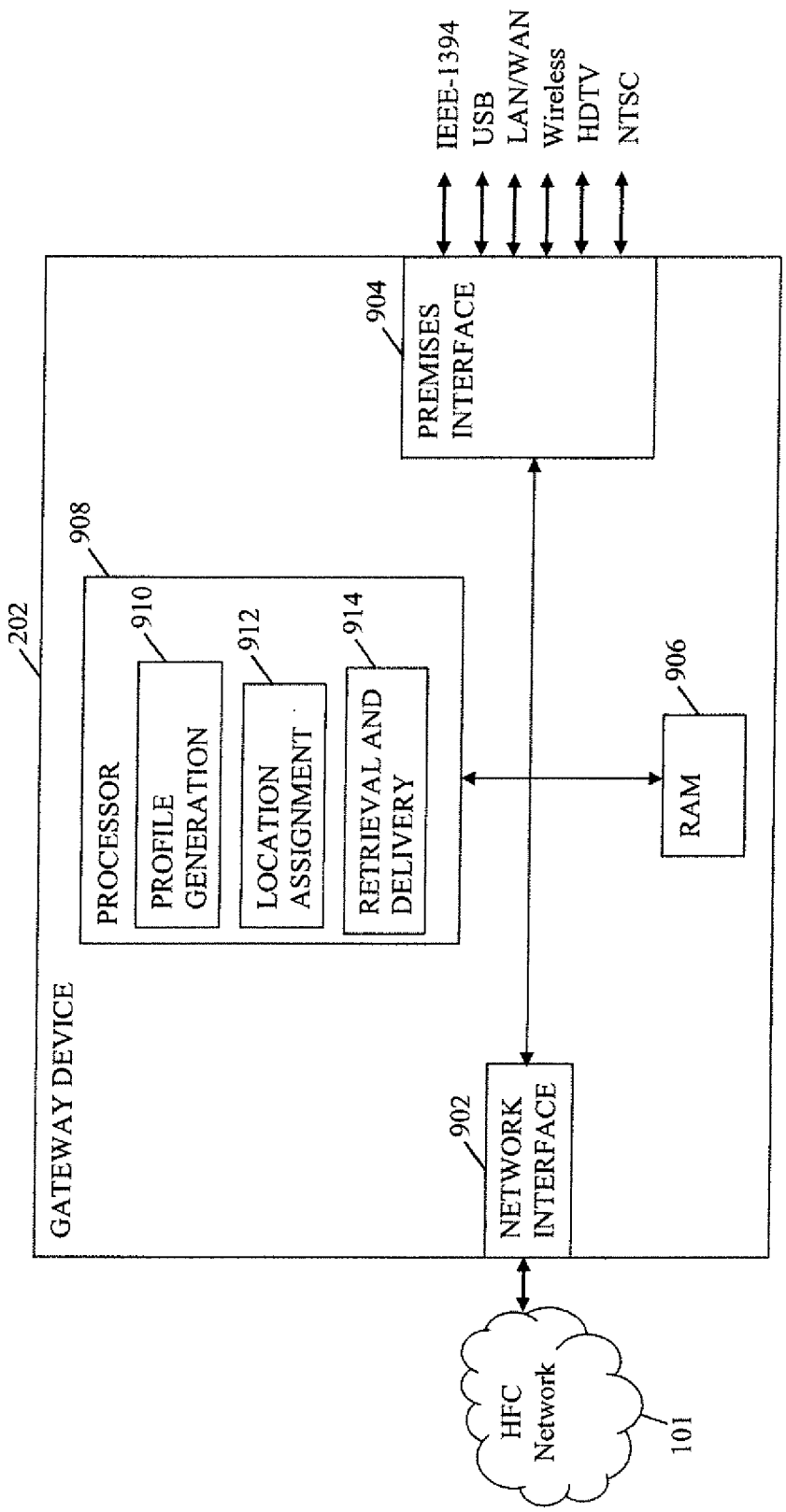
FIG. 9 is a block diagram illustrating an exemplary embodiment of a gateway device for use in providing location identification services within a premises.

FIG. 9 is a block diagram illustrating an exemplary embodiment of a gateway device configured for use in providing location identification services within a premises. As shown, the gateway device 202 generally comprises a network interface 902, a premises interface 904, a processor 908, and an associated storage device 906 (described in greater detail below).

In the illustrated embodiment, the processor 908 is configured to run at least a profile generation application 910, a location assignment application 912, and a retrieval and delivery application 914 thereon, although other software/logic architectures may readily be substituted. The profile generation application 910 is a computer application configured to generate individual device profiles. As discussed previously, the individual device profiles comprise a plurality of data received from a device 210, 212 when the device 210, 212 is located at a particular location within a premises.

In one embodiment, the profile generation application 910 after pinging the client devices 2010, receives response messages therefrom. The response messages comprise information generally used for beamforming analysis as well as other information useful in characterizing a signal. The reported information may include e.g., whether a hot-spot is nearby, error rate information obtained during data delivery, Wi-Fi channel state, RF power, delay, signal phase, signal quality, amplification, etc. The device profile may include the previously referenced "antenna profile", $\Sigma$, which is generated for each device at each location within a premises. The device profile may further comprise a steering table or matrix. The steering table enables the gateway 202 to, inter alia, establish a tolerance range for the measured values for each of e.g., pr, er, pt, etc. for each antenna; the range of values is established to include all possible values which may be received when a device is within a given location (e.g., family room, bed room, kitchen, etc.).

The profile generation application 910 may further receive a re-transmission of IR broadcast signals received at a STB 206 (or other IR receiver) from a plurality of client devices 210, 212. As discussed above, the re-transmission comprises information uniquely identifying the device from which the IR broadcast signal was received and information identifying the STB 206 which re-transmitted the signal.

The location assignment application 912 is in one embodiment configured to associate a qualifier (e.g., name) to the locations in the premises. As indicated above, the locations are identified and/or designated by the user. The location assignment application 912 associates the data received at the profile generation application 910 to a particular location. One or more profiles are therefore associated, via the location assignment application 912, to a particular user-determined location. For example, the locations may be assigned qualifiers such as "kitchen", "family room", "dining room", "bedroom", etc. In addition, the location assignment may cover a range of data extracted from multiple profiles which were used to determine an overall space that is to be considered associated to a particular location (or room within a premises).

It is further appreciated that the gateway device 202 may be provided with location assignment information from e.g., a STB 206 or other IR transceiver in the form of a retransmission of a device 210 IR broadcast. In one embodiment, the location assignment application 912 associates the device 210 information to a known location of the STB 206 (or IR transceiver).

The retrieval and delivery application 914 is configured to retrieve stored information regarding the location of a device 210, 212 (such as by performing a query of a storage entity).

One or more additional applications or modules may be provided to, inter cilia, enable a user to manually correct an incorrectly identified device location, and subsequently store an updated device profile and location assignment. Additionally, applications or modules may be provided to enable the gateway 202 to "learn" locations as entered by a user. For example, at the time a user manually enters a location, the application may be configured cause the device 210 to be pinged, and subsequently use information extracted from the most recent device response message to override any previously stored profile information for the user-entered location.

In yet another embodiment, one or more applications configured to analyze information extracted from the device 210 return messages over time may be provided in order to generate one or more rules for which locations within a premises are near one another. The application(s) then utilize the rules to estimate or predict movement between locations within the premises.

A network interface 902 and a premises interface 904 are further illustrated. The network interface 902 is in the exemplary embodiment configured to provide content and data delivery to and from the MSO network 101. The premises interface 904 provides communication between the gateway 202 and various devices within a premises, such as e.g., client mobile devices 210, fixed devices 212, and STB 206. For example, the premises interface 904 enables communication of client ping messages, as well as receipt of response messages and location requests. Communication between the client devices 210 and premises interface 904 may occur via a wired or wireless communication therewith, such as via e.g., IEEE-1394 (so called "FireWire"), USB, LAN/WAN, Wireless, HDTV, NTSC, etc. communications.

Exemplary Set-Top Box—

Figure 10:
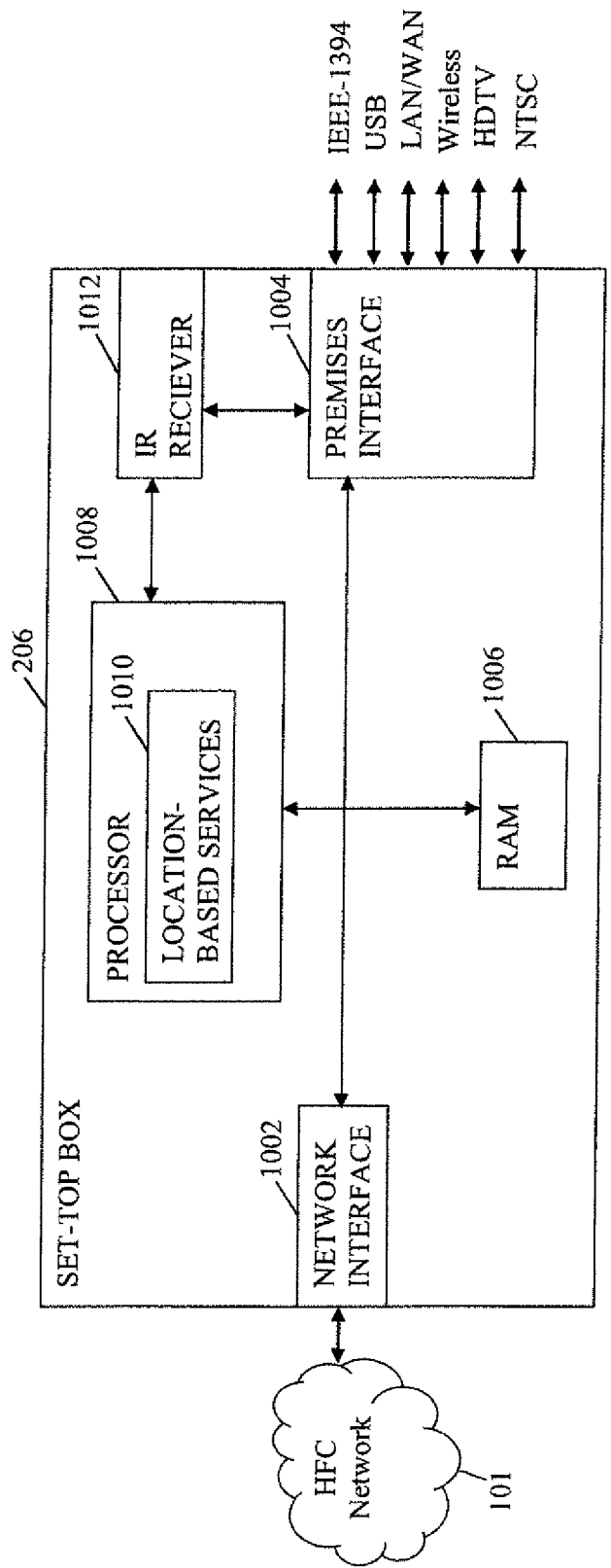
FIG. 10 is a block diagram illustrating an exemplary embodiment of a set-top box for use in providing location identification services within a premises.

FIG. 10 is a block diagram illustrating an exemplary embodiment of a set-top box for use in providing location identification services within a premises. As shown, the device generally comprises a network interface 1002, premises interface 1004, an IR receiver 1012, a processor 1008 and associated storage 1006 (discussed in greater detail below).

The network interface 1002 provides, inter alia, content and data delivery to and from the MSO network 101, such as the herein described HFC network, an internetwork, etc. The premises interface 1004 provides inter alia, communication between the STB 206 and various devices within a premises, such as e.g., client mobile devices 210, fixed devices 212, and the gateway 202. For example, the premises interface 1004 enables receipt of IR broadcast messages from the devices 210 (via the IR receiver 1012), as well as re-transmission of the device messages to the gateway 202 via e.g. IEEE-1394 (so called "Firewire"), USB, LAN/WAN, Wireless, HDTV, NTSC, etc. communication therewith.

In the illustrated embodiment, the processor 1008 is configured to run at least a location-based services application 1010 thereon. The location-based services application 1010 is configured to, when IR signals are received (i.e., signals which were broadcast from one or more client devices 210), identify the device 210 from which they were received (such as via an embedded identifier or other such identifying information within the signal). In a first embodiment, the location-based services application 1010 causes the received IR signal to be re-transmitted to a gateway apparatus 202 without modification thereof (i.e., acts as a repeater). A Wi-Fi premises interface 1004 or other air interface (e.g., Bluetooth, UWB, etc.) may be utilized for wirelessly communicating the re-transmission signal. It is appreciated, however, that the premises interface 1004 and/or communication with the gateway 202 may occur via any number of wired and/or wireless communications modalities of the type previously set forth herein. According to this embodiment, and as discussed previously, the gateway 202 assigns a location to the uniquely identified device 210, which matches the location of the STB 206 from which the re-transmission was received.

Alternatively, the location-based services application 1010 may be configured to append the message to additionally include an assigned location. In other words, the application 1010 appends a previously determined location identifier to the received messages. The location identifier may be previously determined by the gateway apparatus 202 (as discussed above with respect to FIG. 4), and/or a user may manually enter a location identifier for the STB 206.

Exemplary Applications and Implementations—

The herein described apparatus and methods may advantageously be used to provide location-based services in any number of different use cases or scenarios.

In one such case, the location-based services include services which enable particular applications and/or content to be automatically loaded or provided when the user enters a particular location (e.g., a particular room in their house) or a context (e.g., business versus personal).

In a first variant, an application is run on a client mobile device 210 which is configured to, when it is informed by the gateway 202 of the location of the device 210, load particular applications. For example, when the device 210 receives information from the gateway 202 that the device is in the user's kitchen, a grocery shopping list and/or recipe or cooking application are loaded on the device. The device may additionally load content such as most recent content from a cooking-related site, programming content (such as from the Internet and/or an MSO network 101), etc.

In another example, if the device is instead entering a bedroom, the device may load games, educational tools, etc. Generally, the applications and/or content which are caused to be loaded or delivered to the devices are related to the context of the location of the device or user (or that user's use context based on a temporal or other parameter, which may also consider or be irrespective of location). The applications and/or content to be delivered based on location may be manually selected by a user of the application running on the mobile device 210, and/or may be pre-set within the application itself, or according to other methods previously described herein.

It is further appreciated that the foregoing application may instead be run on the gateway 202 or STB 206, thus enabling control of the mobile devices 210 thereby. In addition, the user may create custom home screens for different rooms that feature different applications (recipe files, books, etc.) or select from among network pre-configured home screens for each room type (e.g., bedroom, kitchen, living room, etc.).

In another variant, an energy-saving application is run on a client mobile device 210 which is configured to, when it is informed by the gateway 202 of the location of the device 210, cause non-essential or otherwise identified electronic devices to be shut down (or placed in a "sleep" mode) when the user is no longer in the vicinity of these devices, and/or turn certain devices on when the user is located nearby. According to this variant, the location of a mobile device 210 associated with the user's person is tracked throughout the premises as discussed above. Powering on/off and/or changing the settings (such as air conditioner/heater settings) of the devices may be accomplished via e.g., wireless or wired communication of a command message thereto from e.g., the gateway 202, the mobile device 210, and/or the STB 206.

In another embodiment, the location-based services include services which provide information and/or advertisement opportunities when the user is near a particular public or business location. For example, in large public spaces, such as a zoo, museum, sports arena, convention, job fair, or park, the proximity of a user device 210 to a particular exhibit, ride, or information point (having an IR or other wireless receiver as discussed above). In this manner, information regarding the exhibit, ride, or public area generally (such as maps, emergency information, etc.) may be automatically provided to the device 210. In another example, businesses such as malls, bookstores, coffee shops, food courts, etc. may use the herein-described apparatus and methods to provide e.g., coupons, additional information, updates, etc. relating to a particular location (booth, store, item for sale, etc.).

In yet another embodiment, the apparatus and methods disclosed in co-owned, co-pending U.S. patent application Ser. No. 12/631,713 filed on Dec. 4, 2009 and entitled "APPARATUS AND METHODS FOR MONITORING AND OPTIMIZING DELIVERY OF CONTENT IN A NETWORK", which is incorporated herein by reference in its entirety, is utilized consistent with the location-based services of the present invention to optimize content delivery to multiple user devices. Methods and apparatus for providing location-based services further provide the user (e.g., a subscriber of an IP, cable or satellite network) with the best possible "user experience" at all times, depending on the various hardware/software environments they have available to them, and their current usage needs and preferences. In one implementation of the foregoing, an optimization and monitoring entity (OME) is utilized in conjunction with other network and user premises components to provide the aforementioned functionality. The OME includes one or more software applications which work in conjunction with one another (and with one or more content servers) to determine, evaluate, and provide notification to a user of one or more alternative content delivery platforms (based on e.g., the user's location within a premises), such as for example when a request for content is received. Alternative services, transports, and delivery models, may also be recommended in another variant of the invention, so as to optimize the user's experience in any given scenario within the limitations of the available devices and technology.

In one exemplary use case, requests for content are received at a content server, and forwarded to the OME. The content server may satisfy the request, or may first require selection of a delivery platform. Information identifying the requesting device (such as IP address, MAC address, etc.) and/or the subscriber account or specific user (such as account number, physical address, login/password information, etc.) is derived from or embedded in the content requests, or otherwise retrieved from information contained within the request. Information identifying the user's location within a premises is also provided via the methods and apparatus described herein. The OME uses the collected information to determine whether the requesting device is registered to a known user account by comparing the identification to a database of registered accounts and devices. The OME further uses the aforementioned database to compile a list of all of the other known client devices in a specific user's account. Software applications running on the OME differentiate the various features and capabilities of the different types of client devices registered to the user account, and which may be used to receive content (including e.g., supported codecs, etc.). Additionally, the location of the various client devices may be identified, thereby enabling location-based services to be provided as discussed elsewhere herein.

In another variant, the OME further comprises a "recommendation engine" such as that disclosed in co-owned, co-pending U.S. patent application Ser. No. 12/414,576 filed on Mar. 30, 2009 and entitled "RECOMMENDATION ENGINE APPARATUS AND METHODS", which is incorporated herein by reference in its entirety. The OME recommendation engine determines whether requested content may be provided to the same user on a different platform; e.g., on a different one of the client devices associated with the user's account. Such an alternative device may be recommended based on e.g., location of the user and/or devices, video/audio quality, picture size, bandwidth availability, and/or any other additional capabilities of the recommended client device, or may be recommended based on historical usage or other information about the user (or a specification of user preferences associated with the account and accessed by the OME).

In one implementation, a list of the alternative delivery platforms and/or modes is presented to a user via a notification generated by the OME (or generated by the CPE after being triggered by the OME). The notifications sent to the client device(s) indicate which, if any, of the user's other devices may receive the content alternatively (or in addition to) the content being received at the requesting device and may additionally include a location of each. Alternatively, the list of devices may be filtered to include only those devices within the same general location within the premises. The notifications generated/triggered by the OME are, in one embodiment, interactive in nature and provide a user the ability to select one or more of the presented content delivery platforms, as well as features or configurations associated therewith.

The client devices requesting content and/or being recommended for the delivery of content include, inter cilia, consumer premises devices (CPE) 106 (such as digital set top boxes (STB), IPTV devices, media bridges (MB), converged premises devices (CPD), etc.), personal video recorders (PVR), digital video recorders (DVR), network DVR, computer devices (such as personal computers and laptop computers), and mobile devices (including personal media devices (PMD), tablets, and mobile telephones/smartphones). In one variant of the invention (so-called "chain mode"), the recommendation engine evaluates two or more communicating client devices along a "rendering path" to determine the ultimate delivery configuration to the user (e.g., to prevent instances where the first device encountered in the chain provides the recommendation engine with a false representation of the quality of the entire rendering chain of devices), thereby making selection based on the "weakest link" of the chain.

In another aspect of the invention, a centralized control device is disclosed which permits the transfer or migration of content delivery sessions (e.g., SIP-based IPTV sessions or the like) between two or more devices. In one implementation, the user's premises gateway or DSTB or PC is used as the host device for a user interface which shows the various premises (and "off-net") devices associated with the user/subscriber account or premises network, and their interconnectivity. UI functionality (e.g., a multi-touch-screen GUI, drag-and-drop, speech recognition application, or other interface/input device) allows the user to rapidly designate particular devices for communication, establishment of a session/delivery of content, and/or transfer of existing communication sessions between capable devices (such as may be determined by the OME recommendation engine). Additionally, the herein-described methods and apparatus may be used to enable the system to automatically follow the user as they move between rooms. That is to say, a device associated with the user's person (such as e.g., a mobile device 210) indicates to the OME, gateway 202, etc. where the user is within a premises. The system then automatically transfers content to the devices within the general location of the user. As noted above, various profiles may be utilized to predict a pattern of movement within the user premises, and may further be used to predict where content should be moved in order to follow the user.

For example, when a user who is viewing content on a mobile device enters their living room, the content is automatically presented on a television in that room (either in place of delivery to the mobile device, or in addition thereto); when the user moves to the bedroom, a device in the bedroom (such as e.g., a desktop or laptop computer, another television, and/or a tablet computer) may pick up delivery of the content.

Additional location-based services which may utilize the herein-described methods and apparatus include, e.g., providing parental controls based on a known location of a child or children within a premises. For instance, the mechanisms discussed above may be utilized to determine that a particular device which is associated to a child (e.g., their tablet computer) has entered a particular room (e.g., the family room, a bedroom, etc.). Once the gateway 202 determines that the child has entered the room, a message is transmitted from the gateway 202 to one or more devices in the room indicating the presence of the child, and thereby causing a set of rules or parental controls to be implemented. The rules or parental controls may be pre-configured by the subscriber and may include e.g., ratings requirements (no content rated R, etc.), time limits for use of the device, designated hours of acceptable use of certain devices, automatic recording of viewed programming, generation or reports or data relating to device usage, content forwarding or mirroring at an established monitor device (such as a device known to be in use by a parent via the same mechanism used to establish a location of the child), restrictions on Internet URLs, etc.

Additionally, the location-based services may include providing a device profile based on location. For example, the brightness or volume settings of a particular device may be adjusted to user pre-determined settings based on where the device is located. In other words, the user may establish settings that a device to have decreased volume and/or brightness when it is determined that the device is currently in a bedroom, and increased volume and/or brightness when it is determined that the device has left the user's premises (i.e., is outside of the home). Moreover, indigenous light sensing apparatus on the user device (e.g., a CMOS or CCD imager) can be used to detect ambient light conditions of the current location, and adjust one or more device settings accordingly. For example, when a user transitions from a bright ambient setting to a dim one, the screen brightness (and any control backlighting) may be intensified.

Similar logic can be applied to acoustic attributes; e.g., where a heavy background "din" is present, the volume level of any audible emanations from the device is increased to aid the user hearing them over the din.

In another variant, the determination that a device is leaving or has left a premises causes the device to enter a protected or theft deterrence mode. That is, when the device goes out of range, password protection is implemented and the password is required to reactivate use.

In yet another variant, when the location determination (discussed above) identifies that the user device is within range of a set-top box, gateway, or other MSO-enabled device, a message indicating the location causes the user device to run a program that enables a remote control mode. In other words, the device can be used as a handheld control device for the set-top box when it is determined to be near to the set-top box.

Still further, location-based services may be implemented to enable individual customization of a viewing experience. In one such implementation, when it is determined that a device (such as a mobile device) associated to a particular user is within a given distance to a set-top box or other such device, the gateway 202 notifies the set-top box of the identity of the particular individual currently viewing content thereat. The set-top box may then utilize the identity of the individual to access a customized profile including content, playlists, recommendations, URLs or functions, display theme/settings/layout, etc. specific to that viewer. In the instance more than one individual is identified a modified profile may be used to find content, playlists, recommendations, settings, etc. which are more widely applicable. Alternatively, the viewers may be asked to select from among the available profiles.

In addition, the identification of movement of the user away from a set-top box may trigger the mobile device to obtain content currently being viewed by the user for mobile delivery thereof. In other words, identified movement of the user device away from the set-top box in one variant causes the gateway 202 to transmit a message to the mobile device including information relating to the currently viewed programming content. The mobile device uses this information to access the content and provide it to the user "to go", such as via a WLAN (e.g., Wi-Fi), WiMAX, LTE, or other high-bandwidth wireless interface available on the user device. In one embodiment, playback of the content may begin immediately, and synchronize with the playback on the set-top box so as to provide uninterrupted content delivery.

Movement of the user away from the set-top box and/or gateway may further trigger a message to be displayed to the user indicating that they are leaving the range of their Wi-Fi network, moving into another network, etc.

In another embodiment, location-based services provide a mechanism whereby content stored at the user's DVR (or other storage entity) is automatically synchronized to the user's device based on the device being identified as currently near the DVR. For example, the user may authorize that all new episodes of his/her favorite show be pushed to his/her user mobile device any time the device is sufficiently near to the DVR which has stored the episodes thereon (the proximity being based in one embodiment on the extant wireless capabilities of the user device, such as WLAN range limitations). Additionally, when a device is identified as nearing a public or other Wi-Fi hotspot not particularly associated with the user of the device, the device may be triggered to request content updates (such as the aforementioned "new episodes") from the network for storage at the device.

Still further, the present invention may be implemented in conjunction with a home security system having sensors (such as e.g., those of Zigbee® which use two-way wireless technology and Wi-Fi cameras) established at user-designated locations in the home. One such implementation may utilize the so-called "Intelligent Home" service of the Assignee herein. As used therein, various sensors and/or cameras are established throughout a user's home and labeled according to the room where each is placed. They each communicate wirelessly to a control device. In one embodiment, the control device may further communicate to a client device (e.g., wireless-enabled mobile device). The wireless profile or physical signature (e.g., that discussed with respect to FIG. 2 and Table 1 supra) of the client device is then compared to that of the sensor devices to determine which if any of the sensors most closely resembles the client device profile. A location of the sensor having a wireless profile matching that of the client device may then be applied to the client device.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of generating a client device-specific profile, said profile relating a client device to a plurality of positions thereof within a given area, said method comprising:
   transmitting at least one request signal from a gateway device to said client device, said at least one request signal being transmitted to said client device when said client device is located at each of said plurality of positions within said given area;
   receiving, in response to said transmitted at least one request signal, a response signal from said client device indicating one or more device-specific characteristics;
   determining one or more antenna signatures associated with said client device based on said response signal received from said client device indicating said one or more device-specific characteristics;
   storing said determined one or more antenna signatures in said client device-specific profile relating said client device to each of said plurality of positions within said given area;
   determining at least one predicted pattern of movement of said client device based at least on said determined one or more antenna signatures in said client device-specific profile;
   in response to a subsequent location request signal from said client device, correlating said client device to one of said plurality of positions within said given area based at least in part on comparing said one or more antenna signatures stored in said client device-specific profile to one or more antenna signatures of said subsequent location request signal;
   identifying a predicted future movement of said client device based at least on said correlation and said at least one predicted pattern of movement; and
   in response to said identification of said predicted future movement, predicting a piece of content to send to said client device.

2. The method of claim 1, wherein said one or more device-specific characteristics comprise at least one of: antenna receive power, an error rate, and/or a transmit power.

3. The method of claim 1, further comprising assigning an identifier to said profile, said identifier configured to identify said position within said given area in user-cognizable terminology.

4. The method of claim 3, further comprising:
   receiving a location request from a first client device;
   evaluating device-specific information in said location request against said profile to identify said profile as comprising device-specific characteristics which correlate to said device-specific information of said location request; and
   providing an assigned identifier associated to said profile to said first client device.

5. The method of claim 1, further comprising:
   receiving a communication from a first client device;
   utilizing at least device-specific information in said communication to correlate said profile thereto; and
   causing one or more content to be displayed at said first client device based at least in part on said correlation to said profile.

6. A mobile user wireless device configured for location-specific operation, said device comprising:
   a processor apparatus;
   a wireless transceiver in data communication with said processor apparatus; and
   a storage device in data communication with said processor apparatus and having a computer program disposed thereon, said computer program configured to, when executed:
      generate a location request in order to query a location of said mobile device within a premises;
      cause transmission of said location request to a gateway device;
      generate, in response to a first transmission received at said transceiver from said gateway device, a reply uniquely identifying said mobile device;
      cause transmission of said reply to said gateway device;
      receive, from said gateway device, a second transmission comprising location information that identifies to said mobile device said location within said premises at which said mobile device is located; and
      based at least in part on said location information, cause adjustment of at least one user interface so as to provide at least one location-specific content element to a user of said device;

wherein said program is further configured to, when executed, based at least in part on said location information, transmit location data to said gateway device such that said gateway device is configured to track a movement of said mobile device around said premises; and wherein said gateway device is further configured to predict a future movement of said mobile device, and said adjustment of said at least one user interface is based on said prediction of future movement.

7. The device of claim 6, wherein said location information is derived from at least one of: antenna receive power, error rate, client transmit power, signal quality, and amplification needed to transmit and/or receive signals.

8. The device of claim 6, wherein said location information comprises a location near a public or business location and said location-specific content element comprises an advertisement or information regarding said public or business location.

9. The device of claim 6, wherein said wireless transceiver comprises an infrared (IR) interface and said computer program is further configured to, when executed, broadcast short range wireless signals to said gateway device.

10. A method of correlating a mobile device to a position thereof within a given area, said method comprising:
generating, in response to a first transmission received at a wireless transceiver, a reply uniquely identifying said mobile device, said reply comprising at least error rate information;
causing transmission of said reply to a gateway device;
receiving a second transmission including location information of a predicted subsequent location of said mobile device within a premises, said subsequent location predicted based at least partly on said at least error rate information;
based at least in part on said location information of said predicted subsequent location, causing an adjustment of at least one user interface so as to provide to a user of said mobile device at least one content element specific to said predicted subsequent location;
based at least in part on said location information, transmitting location data to said gateway device such that said gateway device is configured to track a movement of said mobile device within said premises; and
enabling said gateway device to predict a future movement of said mobile device; wherein said act of causing adjustment of said at least one user interface is based at least in part on said prediction of future movement.

11. The method of claim 10, wherein said receiving a second transmission further comprises receiving location information of a current location of said mobile device within said premises, said current location determined based at least partly on at least one of: antenna receive power, client transmit power, signal quality, and amplification needed to transmit and/or receive signals.

12. The method of claim 10, wherein said location information comprises a location near a public or business location and said content element specific to said predicted subsequent location comprises an advertisement or information regarding said public or business location.

13. The method of claim 10, further comprising broadcasting short range wireless signals to said gateway device from said wireless transceiver, said wireless transceiver comprising an infrared (IR) interface.

14. The method of claim 10, wherein said predicted subsequent location is determined at least partly based on a predicted pattern of movement correlating said error rate information to a plurality of locations within said premises.

15. The method of claim 14, wherein said predicted subsequent location is determined at least partly based on one of a degradation or an improvement of device performance relative to one or more of said plurality of locations with said premises.

* * * * *